(12) United States Patent
Bronner et al.

(10) Patent No.: US 10,057,298 B2
(45) Date of Patent: Aug. 21, 2018

(54) CONFIGURABLE INVESTIGATIVE TOOL

(75) Inventors: Derek P. Bronner, Chittenango, NY (US); Robert A. Joyce, Ithaca, NY (US); Matthew P. Donovan, Trumansburg, NY (US); Julia A. Baker, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 124 days.

(21) Appl. No.: 13/024,995

(22) Filed: Feb. 10, 2011

(65) Prior Publication Data

US 2012/0210427 A1 Aug. 16, 2012

(51) Int. Cl.
*G06F 21/00* (2013.01)
*H04L 29/06* (2006.01)

(52) U.S. Cl.
CPC .................................. *H04L 63/30* (2013.01)

(58) Field of Classification Search
USPC ........................................ 726/22–25; 713/188
See application file for complete search history.

(56) References Cited

U.S. PATENT DOCUMENTS

| | | | |
|---|---|---|---|
| 6,345,283 B1 | 2/2002 | Anderson | |
| 6,792,545 B2 | 9/2004 | McCreight et al. | |
| 7,058,968 B2 * | 6/2006 | Rowland et al. | 726/1 |
| 7,228,566 B2 * | 6/2007 | Caceres et al. | 726/25 |
| 7,496,959 B2 | 2/2009 | Adelstein et al. | |
| 7,694,328 B2 * | 4/2010 | Joshi et al. | 726/2 |
| 7,748,040 B2 * | 6/2010 | Adelstein et al. | 726/25 |
| 7,818,804 B2 | 10/2010 | Marceau | |
| 7,886,049 B2 * | 2/2011 | Adelstein et al. | 709/224 |
| 8,176,557 B2 | 5/2012 | Adelstein et al. | |
| 8,321,437 B2 | 11/2012 | Lim | |
| 8,341,732 B2 * | 12/2012 | Croft et al. | 726/21 |
| 2002/0073204 A1 | 6/2002 | Dutta et al. | |
| 2002/0078382 A1 * | 6/2002 | Sheikh | H04L 41/0866 726/22 |
| 2002/0129264 A1 | 9/2002 | Rowland et al. | |
| 2002/0162017 A1 | 10/2002 | Sorkin et al. | |
| 2002/0163934 A1 | 11/2002 | Moore et al. | |
| 2003/0208689 A1 | 11/2003 | Garza | |
| 2003/0236993 A1 * | 12/2003 | McCreight et al. | 713/200 |
| 2004/0039921 A1 | 2/2004 | Chuang | |
| 2005/0193173 A1 * | 9/2005 | Ring | G06F 21/57 711/118 |
| 2005/0203921 A1 | 9/2005 | Newman et al. | |

(Continued)

FOREIGN PATENT DOCUMENTS

WO 02071192 A2 9/2002

OTHER PUBLICATIONS

Helix Opensource User Manual , 2009, Downloaded from http://www.sdp-tech.com/sdp-tech/pub/helix/Helix_Opensource_User_Manual.pdf.*

(Continued)

*Primary Examiner* — Harris C Wang
(74) *Attorney, Agent, or Firm* — Shumaker & Sieffert, P.A.

(57) ABSTRACT

This disclosure provides example techniques to invoke one or more tools, with an investigative tool. The investigative tool provides a common framework that allows investigators to invoke their own trusted tools or third-party generated tools. The investigative tool described herein seamlessly and transparently invokes the tools in accordance with an investigative profile created by the investigator.

25 Claims, 12 Drawing Sheets

(56) References Cited

U.S. PATENT DOCUMENTS

| | | | |
|---|---|---|---|
| 2006/0167855 A1 | 7/2006 | Ishikawa et al. | |
| 2006/0248525 A1 | 11/2006 | Hopkins | |
| 2007/0006311 A1* | 1/2007 | Barton | G06F 21/552 |
| | | | 726/24 |
| 2007/0055766 A1* | 3/2007 | Petropoulakis et al. | 709/224 |
| 2009/0150998 A1 | 6/2009 | Adelstein et al. | |
| 2009/0164522 A1* | 6/2009 | Fahey | H04L 63/1441 |
| 2009/0165142 A1* | 6/2009 | Adelstein | G06F 21/55 |
| | | | 726/26 |
| 2009/0288164 A1* | 11/2009 | Adelstein | H04L 63/123 |
| | | | 726/22 |
| 2009/0328033 A1* | 12/2009 | Kohavi et al. | 718/1 |
| 2012/0173570 A1* | 7/2012 | Golden | G06Q 10/0631 |
| | | | 707/769 |

OTHER PUBLICATIONS

Carla Marceau et al., "A peer-to-peer architecture for secure data storage with query," in the Proceedings of the SPIE Defense Transformation and Network-Centric Systems 2005, Mar. 28-31, 2005, Orlando, FL, 12 pgs.

Frank Adelstein and Robert A. Joyce, "File Marshal: Automatic extraction of peer-to-peer data," Digital Investigation 4S (2007) S43-S48, www.sciencedirect.com, Aug. 14, 2007, 6 pgs.

Dr. Rob Joyce et al., "Peer-to-Peer File Marshal," http://www.dfrws.org/2007/proceedings/p43-adelstein_pres.pdf, DFRWS 2007, Pittsburgh, Pennsylvania, Aug. 14, 2007, 11 pgs.

U.S. Appl. No. 13/025,007, filed Feb. 10, 2011, and entitled "Configurable Forensic Investigative Tool".

Office Action from U.S. Appl. No. 12/370,447, dated May 12, 2011, 10 pp.

Response to Office Action dated May 12, 2011, from U.S. Appl. No. 12/370,447, filed Aug. 8, 2011, 11 pp.

Office action from U.S. Appl. No. 13/025,007, dated Dec. 28, 2012, 32 pp.

Response filed in U.S. Appl. No. 13/025,007, dated Mar. 28, 2013, 11 pp.

Response filed in U.S. Appl. No. 13/025,007, dated Sep. 3, 2013, 5 pp.

Pre-Appeal Brief Request for Review filed in U.S. Appl. No. 13/025,007, dated Oct. 3, 2013, 5 pp.

Final Office Action from U.S. Appl. No. 13/025,007, dated Dec. 19, 2014, 35 pp.

Response to Office Action dated Apr. 24, 2014, from U.S. Appl. No. 13/025,007, filed Aug. 25, 2014, 16 pp.

Office Action from U.S. Appl. No. 13/025,007, dated Apr. 24, 2014, 32 pp.

Response to Final Office Action dated Dec. 19, 2014, from U.S. Appl. No. 13/025,007, dated Feb. 19, 2015, 8 pp.

Final Office Action from U.S. Appl. No. 13/025,007, dated Jun. 3, 2013, 30 pp.

Reply Brief from co-pending U.S. Appl. No. 13/025,007, filed Apr. 4, 2016, 14 pp.

Examiner's Answer from co-pending U.S. Appl. No. 13/025,007, dated Feb. 2, 2016, 37 pp.

Decision on Appeal from U.S. Appl. No. 13/025,007, dated Sep. 26, 2017, 10 pp.

Office Action from U.S. Appl. No. 13/025,007, dated Dec. 28, 2017, 20 pp.

Amendment in Response to Office Action dated Dec. 28, 2017, from U.S. Appl. No. 13/025,007, filed Apr. 25, 2018, 13 pp.

Notice of Allowance from U.S. Appl. No. 13/025,007 dated May 17, 2018, 8 pp.

* cited by examiner

```
[_options]
encrypt=False
compress=False                  } 60
output-format=raw
concurrency=1

[_labels]
default = ipconfig

[memory_acquisition]
command = /usr/local/lmarshal/mdd.exe
arguments = -o FILEARG
needs =                                              } 64A
copy = True
on_error = continue
description = Acquires RAM image of target machine.
filearg=memory.dmp

[ipconfig]
command = ipconfig
arguments =
needs =                     } 64B
copy = False
on_error = continue
description =

[psinfo]
command = /home/matthew/projects/sysinternals/Psinfo.exe
arguments =
needs =                                                  } 64C
copy = True
on_error = continue
description =

[psloggedon]
command = /home/matthew/projects/sysinternals/psloggedon.exe
arguments =
needs =                                                     } 64D
copy = True
on_error = halt
description =

#   Action created on 08-09-2010 13:08:54

[write_test]
description =
on_error = continue                                       } 64E
arguments =
command = /home/matthew/projects/lmarshal/write_test.exe
copy = True
```

FIG. 5

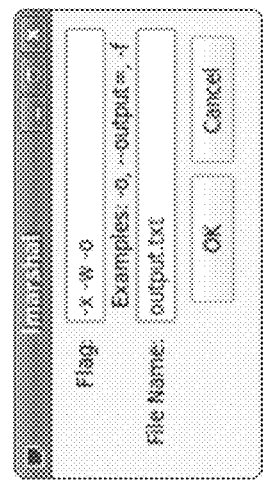
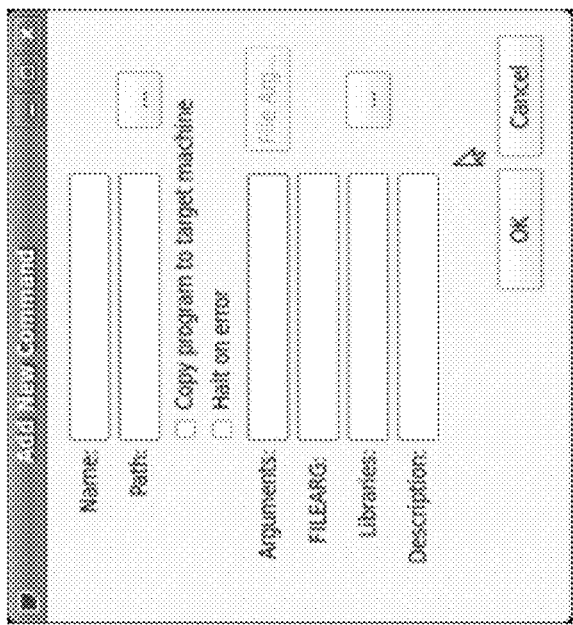
FIG. 8
FIG. 9
FIG. 10

CONFIGURABLE INVESTIGATIVE TOOL

STATEMENT REGARDING FEDERALLY SPONSORED RESEARCH OR DEVELOPMENT

This invention was made with Government support under Contract FA8750-08-C-0242 with the United States Air Force (USAF). The Government may have certain rights in this invention.

TECHNICAL FIELD

This disclosure relates to computer data and, more particularly, to techniques for remotely acquiring computer data relating to a target computer.

BACKGROUND

Computer forensics is the application of computer investigation and analysis techniques to identify and capture potential legal evidence stored or otherwise maintained within a computing device. The evidence might be sought during an investigation for a wide range of potential computer crimes or misuse, including theft of trade secrets, theft of service, theft of or destruction of intellectual property, fraud, hacking, and other criminal or misuse activities. The evidence might also be sought during an investigation of non-computer related crimes or misuse where the computing device may store evidence for the non-computer related crime or misuse. For example, the computing device of a suspect may store computer evidence, such as e-mails or ransom notes, which tie the suspect to a kidnapping. Unlike paper evidence, computer evidence can exist in many forms, with earlier versions and even some deleted versions of the evidence still accessible on a storage medium. Forms of computer evidence may include, for example, system log files, executing processes, stored files and the like.

An investigator may draw on an array of methods to discover and capture evidence from a computer device. One common method for obtaining computer evidence is on-site inspections or seizure of the computer. For example, the investigator may physically connect an analysis device to the target computer or load analysis software on the target computing device to acquire and analyze the computer evidence. As another example, the investigator may physically remove the target computer from its location, and analyze the target computer in the investigator's lab. However, when these discovery techniques are used on computers critical to a network, e.g., servers, the investigation may become burdensome on the network users. Moreover, it is often desired to collect evidence from a computer over time without being detected by a perpetrator of the crime, which can be difficult with many of these invasive techniques. Furthermore, in some cases, it may be possible for volatile computer evidence to be lost, e.g., computer evidence stored in volatile memory may be deleted, when the target computer is turned off.

SUMMARY

In general, this disclosure is directed to a highly configurable investigative tool which an investigator can easily configure and adapt for rapid examinations of one or more target computing devices. For example, the software tool described herein enables an investigator to rapidly acquire data from or monitor one or more target computing devices over an enterprise network, or directly from the one or more target devices by inserting a drive that stores the software tool into the one or more target computing devices. The user-configurable software tool allows investigators to incorporate their own, trusted tools to assess threat and risk in order to take rapid corrective action.

More specifically, the investigative tool provides a framework including a common user interface and reporting structure that allows the investigator to programmatically invoke other tools and utilities to perform various types of examinations of a target computing device. The other tools and utilities may be provided by third party entities or even self-created by the investigator, and the investigative tool described herein seamlessly and transparently invokes the tools in accordance with an investigative profile created by the investigator.

For example, the investigator may configure the investigative tool to programmatically invoke tools to perform a forensic investigation to gather forensic data from the one or more target computing devices. As another example, the investigator may configure the investigative tool to programmatically invoke tools to monitor and detect intrusion agents, such as viruses, on the one or more target computing devices. As yet another example, the investigator may configure the investigative tool to programmatically invoke tools to monitor content, such as e-mails, on the one or more target computing devices.

In one example, aspects of this disclosure are directed to a method. The method comprises storing an investigative profile that identifies a plurality of tools and defines a manner in which an investigative tool invokes the identified tools for an investigation of a target computing device. The method further comprises configuring the investigative tool on an investigative device for the investigation based on the investigative profile to provide a common execution framework for selective execution of the plurality of tools identified by the investigative profile.

The method also comprises transferring, with the investigative device upon execution of the investigative tool, one or more of the identified tools and a remote agent to the target computing device. The method further comprises executing, with the investigative device upon execution of the investigative tool, the remote agent on the target computing device to execute the identified tools on the target computing device in the manner defined by the investigative profile. The method also comprises receiving, with the investigative tool executing on the investigative device, data acquired from the target computing device by the execution of the identified tools in the manner defined by the investigative profile.

In another example, aspects of this disclosure are directed to an investigative device. The investigative device comprises a storage device that stores an investigative profile that identifies a plurality of tools and defines a manner in which an investigative tool invokes the identified tools for an investigation of a target computing device.

The investigative device also comprises a hardware unit that executes the investigative tool. The hardware unit executes the investigative tool to configure the investigative tool for the investigation based on the investigative profile to provide a common execution framework for selective execution of the plurality of tools identified by the investigative profile. The hardware unit also executes the investigative tool to transfer one or more of the identified tools and a remote agent to the target computing device.

The hardware unit also executes the investigative tool to execute the remote agent on the target computing device to execute the identified tools on the target computing device in the manner defined by the investigative profile. The hardware unit further executes the investigative tool to receive data acquired from the target computing device by the execution of the identified tools in the manner defined by the investigative profile.

In another example, aspects of this disclosure are directed to a non-transitory computer-readable storage medium comprising instructions that cause one or more processors to perform various functions. The instructions cause the one or more processors to store an investigative profile that identifies a plurality of tools and defines a manner in which an investigative tool invokes the identified tools for an investigation of a target computing device. The instructions further cause the one or more processors to configure the investigative tool for the investigation based on the investigative profile to provide a common execution framework for selective execution of the plurality of tools identified by the investigative profile.

The instructions also cause the one or more processors to transfer, upon execution of the investigative tool, one or more of the identified tools and a remote agent to the target computing device. The instructions also cause the one or more processors to execute, upon execution of the investigative tool, the remote agent on the target computing device to execute the identified tools on the target computing device in the manner defined by the investigative profile. The instructions further cause the one or more processors to receive, with the investigative tool, data acquired from the target computing device by the execution of the identified tools in the manner defined by the investigative profile.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is an example illustration of an investigative profile.

FIG. 8 is a screen illustration of an example of a window with which a user can add a tool.

FIG. 9 is a screen illustration of an example of a window to enter the path name a tool.

FIG. 10 is a screen illustration of an example of a window to enter the output filename where the acquired data should be stored.

DETAILED DESCRIPTION

Figure 1:
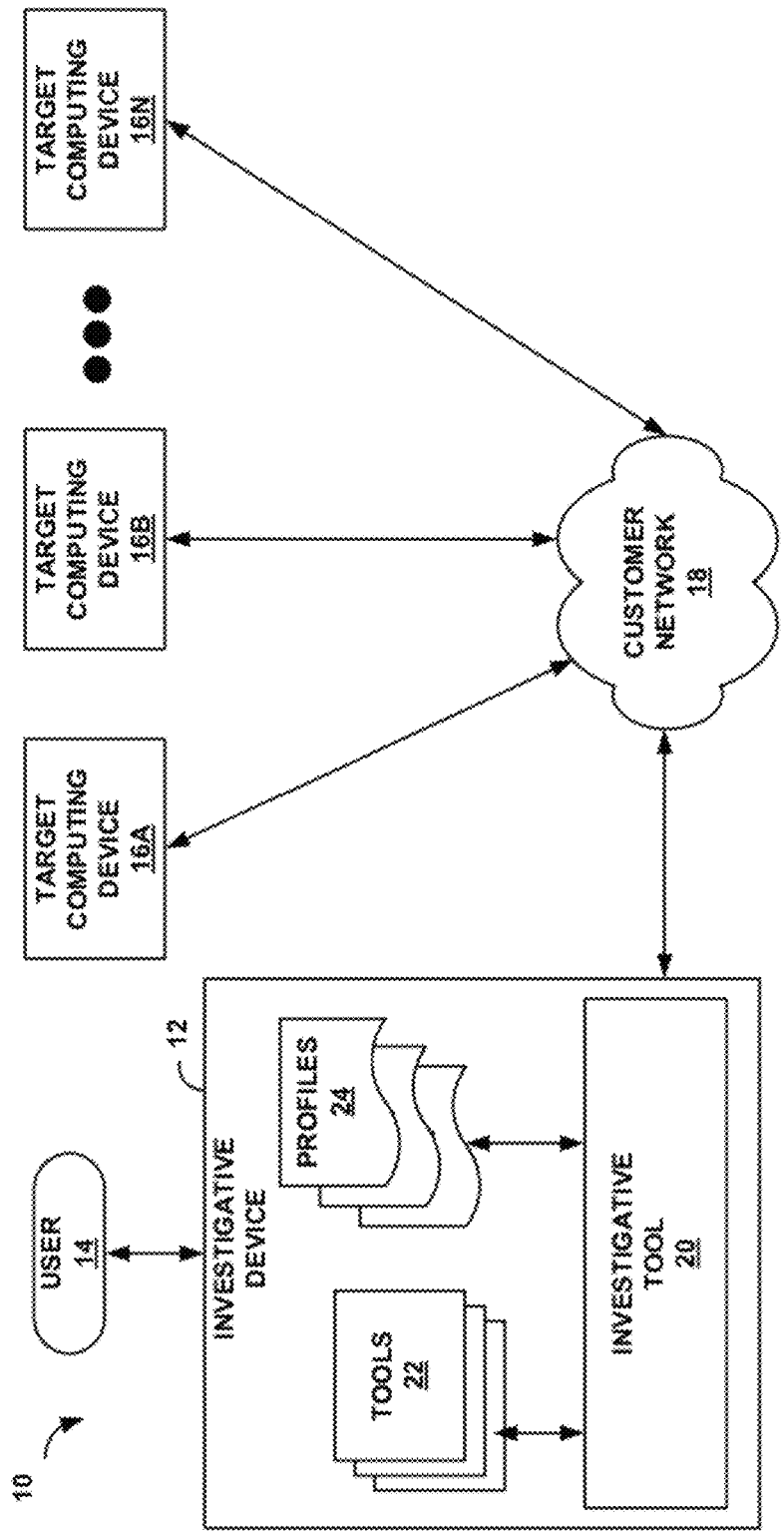
FIG. 1 is a block diagram illustrating a computer system for analysis of computer data in accordance with one example of this disclosure.

FIG. 1 is a block diagram illustrating a computer system 10 for analysis of computer data in accordance with one example of this disclosure. Computer system 10 includes an investigative device 12 that allows user 14, such as an investigator or network administrator, to remotely interrogate target computing device 16A-16N (collectively referred to as "target computing devices 16") in order to collect and/or analyze computer data that may be stored on target computing devices 16. Investigative device 12 allows user 14 to acquire the computer data from target computing devices 16 with a reduced impact on target computing devices 16. For example, one or more of target computing devices 16 need not be physically seized or otherwise "shut down" in order to acquire the computer data.

As illustrated in FIG. 1, investigative device 12 and target computing devices 16 are coupled to a common network, such as customer network 18. In this manner, customer network 18 acts as a communication link connecting investigative device 12 with target computing devices 16. Customer network 18 may, for example, be a local area network for a specific site of an enterprise, or may span geographically distributed sites within the enterprise. In other words, customer network 18 may include one or more Local Area Networks (LANs), Wide Area Network (WANs), Wireless LANs or the like. Additionally, customer network 18 may include digital subscriber lines (DSLs), cables or other broadband connections. Customer network 18 may include one or more connected network devices (not shown), such as personal computers, laptop computers, handheld computers, workstations, servers, routers, switches, printers, fax machines, or the like.

In general, investigative device 12 is typically connected to the same local subnet as target computing devices 16, although this is not required. In an example in which customer network 18 includes more than one LAN, investigative device 12 may be connected to the same LAN as target computing devices 16. In this manner, investigative device 12 obtains an Internet Protocol (IP) address within the subnet scope of the LAN to which each one of target computing devices 16 is connected. Investigative device 12 may obtain the IP address dynamically, e.g., via Dynamic Host Configuration Protocol (DHCP), or statically via configuration by a network administrator.

Investigative device 12 may comprise a laptop computer, network appliance, hand-held computing device, network-enabled smart-phone, or other computing device for executing investigative tools, such as investigative tool 20, that acquire data from target computing devices 16. Target computing devices 16 may comprise a personal computer, a handheld computer, a laptop computer, a workstation, a router, a gateway device, a firewall device, a web server, a file server, a database server, a mail server, a print server, a network-enabled personal digital assistant, and a network-enabled phone. Although FIG. 1 illustrates a plurality of target computing devices 16, aspects of this disclosure are not so limited. In some examples, computer system 10 includes more or fewer target computing devices 16. As one example, computer system 10 includes only one of target computing devices 16.

In some examples, computer system 10 includes a separate client device (not shown) connected to customer network 18. In examples where system 10 includes the client device, user 14 may interact with the client device, which in turn issues commands to and receives reports from investigative device 12. In these examples, the client device may communicate with investigative device 12 via a secure connection through customer network 18. In this manner, all the data sent between investigative device 12 and the client device may be encrypted to prevent unauthorized access to the data. Investigative device 12 may, for example, use a communication protocol such as HTTPS (hypertext transfer protocol with SSL, secure socket layer) to encrypt and transmit data securely to user 14.

In the illustrated example, investigative device 12 provides an operating environment for investigative tool 20. That is, investigative tool 20 is software tool that enables user 14 to rapidly yet non-invasively acquire data from and/or monitor data on one or more of target computing devices 16 via network 18. Investigative tool 20 is a user-configurable software tool that allows user 14 and other investigators to incorporate their own, trusted tools. In general, investigative tool 20 may be deployed as software program code having executable instructions stored on a storage device. In some examples, the investigative tool is stored within a storage device of investigative device 12, such as a hard drive. In some alternate examples, as described in more detail with respect to FIG. 2, investigative tool 20 is stored on a drive such as a Universal Serial Bus (USB) flash drive, as one example.

When executed, investigative tool 20 acquires data from and/or monitors data on one or more target computing devices 16. As one example, user 14 executes investigative tool 20 on investigative device 12, which in turn acquires data from target computing devices 16 via customer network 18. As another example, user 14 inserts the drive that stores investigative tool 20 into one of target computing devices 16, e.g., target computing device 16A, as illustrated in more detail in FIG. 2, and executes investigative tool 20 on target computing device 16A. In this example, investigative tool 20 acquires data from target computing devices 16 and stores the acquired data on the drive, or some other device.

As will be described in further detail below, investigative tool 20 provides a framework including a common graphical or text user interface and reporting structure that allows user 14 to programmatically invoke one or more tool and utilities, referred to as tools 22, to perform an overall examination of one or more target computing devices 16. Tools 22 may be provided by third party entities or even self-created by the investigator, and investigative tool 20 seamlessly and transparently invokes tools 22 in accordance with a plurality of different investigative profiles 24 created by user 14. Investigative tool 20 provides a framework for remote deployment and execution of a set of selected tools 22 on one or more target computing devices 16, in accordance with one or more investigative profiles 24, to acquire data from the particular target computing devices 16 that are the subject of the investigation.

In this manner, user 14 may be able to quickly configure investigative tool 20 for different investigation situations and for specific types of target computing devices 16. For example, user 14 may build each one of investigative profiles 24 based on a variety of factors such as the type of evidence needed to be collected or analyzed, the specific hardware and software configuration of the target computing device and possibly even the likelihood of detection by the person or operator under investigation. User 14 may create and store a variety of investigative profiles 24 that can be quickly selected and utilized depending on the specific situation. In general, each one of investigative profiles 24 sets out which specific tools 22 should be utilized, the order in which tools 22 should be invoked, the specific operational parameters and manner in which each one of tools 22 should be invoked, the specific data to capture from each target computing device 16, and the manner in which results are reported and captured, and the handling of error conditions.

Each one of investigative profiles 24 may also specify which target computing devices 16 to investigate, whether data should be acquired from target computing devices 16 in parallel or sequentially, where to store the acquired data, when to investigate target computing devices 16, as well as actions to be taken based on the status of target computing devices 16. Each one of investigative profiles 24 may define the actions to be taken in response to certain events, such as when one or more target computing devices 16 crash, are rebooted, are turned off, or become inaccessible, as a few examples. As described below, investigative device 12 may include a configurator for generating investigative profiles 24 and a controller for configuring and executing software processes, referred to as investigative agents, to execute examinations on specific one or more of target computing devices 16 in accordance with selected investigative profiles 24.

In some examples, investigative profiles 24 define characteristics associated with target computing devices 16, such as a host name of one or more of target computing devices 16, an IP address associated with one or more target computing devices 16, a type of operating system run by one or more of target computing devices 16, and passwords for accessing target computing devices 16. The controller provides one or more methods for accessing target computing devices 16, e.g., via invoking a Secure Shell (SSH), Windows Management Instrumentation (WMI) or Server Message Block (SMB) client. As described in more detail below, the controller may utilize a remote command execution tool (RCET) to access data from target computing devices 16. User 14 may obtain at least a portion of investigative profiles 24 from a network administrator or other individual prior to logging into investigative device 12. Investigative tool 20 generates an investigation based on the selected one of investigative profiles 24.

Investigative profiles 24 provide a flexible means for directing and controlling investigative tool 20 to perform environment-specific investigations using the generalized framework provided by the tool. For example, with each investigative profile 24, user 14 can specify a different one or more of tools 22 which should be executed and the manner in which tools 22 should be invoked. In this way, the common framework provided by investigative tool 20 and profiles 24 allows user 14 to perform very specific desired investigations, which can be different for different target computing devices 16, network environments and even the type of data to be collected and/or analyzed. This flexible framework may allow user 14 to define a complete investigation and receive all of desired data with one investigation, rather than perform piecemeal ad-hoc data collection with disparate tools, which can be time consuming.

For example, user 14 may specify tools 22, with an investigative profile 24, that gather forensic evidence from one or more target computing devices 16. As another example, user 14 may specify tools 22, with an investigative profile 24, that monitor and detect intrusion agents such as viruses on one or more target computing devices 16. As yet another example, user 14 may specify tools 22, with an investigative profile 24, that evaluate content stored on one or more target computing devices 16.

The third-party tools or user-generated tools, e.g., tools 22, managed and invoked by investigative tool 20 may be executable programs, scripts, plug-ins or other utilities that are capable of performing operations to collect a wide variety of information from target computing devices 16. As one example, user 14 may define one of investigate profiles 24 that invokes a particular trusted tool 22 capable of ascertaining and identifying any files that are currently open on one or more target computing devices 16. As another example, user 14 may specify in one of investigative profiles 24 that a particular tool 22, from a set of tools 22, should be invoked to collect all configuration data and settings related to network communications, e.g., transmission control protocol (TCP) and Internet protocol (IP), e.g., TCP/IP, configuration settings. Tools 22 may perform many functions in addition to those listed above, and these functions are provided for illustration purposes and should not be considered as limiting.

In this manner, investigative tool 20 may provide a highly configurable framework which user 14 may configure to perform various types of investigations with the same investigative tool 20. The high configurability of investigative tool 20 also allows user 14 to rapidly respond to new threats. For instance, as new viruses are designed and deployed, user 14, or a third-party, can design a specific tool 22 to detect such intrusion agents, i.e., viruses being one non-limiting example of an intrusion agent. User 14 can then invoke such a tool with investigative tool 20 to monitor target computing devices 16 to determine whether target computing devices 16 store such a virus. As another example, user 14 may desire to perform an investigation, different than the examples provided above. In this example, user 14, or a third-party, can design a specific tool 22 to perform such an investigation. User 14 can then invoke such a tool with investigative tool 20 to perform the investigation desired by the user 14. Accordingly, investigative tool 20 provides user 14 with a highly configurable framework with which user 14 can perform a range of investigations such as very specific investigations, e.g., detect specific intrusion agents or monitor content on target computing devices 16, or general investigations, e.g., collect any forensic evidence stored on target computing devices 16.

As described in further detail herein, investigative tool 20 may provide a login screen to user 14 via which user 14 inputs a username and password to connect to investigative device 12 and manage a local repository of investigative profiles 24. In some examples, the configurator of investigative tool 20 presents to user 14, via investigative device 12, a comprehensive list of available tools 22 for acquisition and/or monitor operations that investigative device 12 can perform for the created inquiry. Tools 22, when executed, acquire or monitor computer data, which is referred to herein generally as "data," from target computing devices 16. User 14 interacts with investigative device 12 through a series of menus provided by investigative tool 20 or through a command line interface to create one or more investigative profiles 24. In response, investigative device 12 causes the target computing devices 16 to execute the one or more tools 22 called out by the investigative profile 24 via one or more of the identified access methods to acquire data from one or more target computing devices 16.

As will be described, in some examples, investigative device 12 acquires or monitors the computer data from target computing devices 16 while the target computing devices are active. In other words, investigative device 12 acquires or monitors the computer data from target computing devices 16 without target computing devices 16 being physically seized or otherwise "shut down." Additionally, investigative device 12 may acquire the computer evidence from target computing devices 16 without having to pre-load acquisition software on target computing devices 16 prior to acquiring or monitoring the computer data, i.e., prior to investigative device 12 beginning the investigation.

During this process, investigative device 12 securely stores the retrieved data in a repository and generates reports that present the collected data in a unified fashion. In some examples, the repository may be maintained internal to investigative device 12. In other alternate examples, the repository may be maintained external to investigative device 12 on a local device or a remote secure storage server. For example, the repository may be maintained by a client device that is in communication with investigative device 12 or within a server that is external to investigative device 12 and associated with an organization that is conducting the investigation.

In some cases, investigative device 12 may pre-process the collected data and store the data in the repository in a common file format to facilitate reporting. Investigative device 12 may, for example, retrieve data in a variety of formats due to the use of third-party tools. The common file format may allow investigative tool 20 to generate reports that coalesce the data into a common report that is more easily read and understood by user 14.

In some examples, investigative device 12 also generates and stores metadata that describes the retrieved data. The metadata may indicate which particular tool 22 retrieved the data, the version of the tool 22, the date and time when investigative device 12 retrieved the data, the identity of user 14, and the format in which the data is stored, as a few examples.

Investigative tool 20 may include a report builder and viewer for viewing the retrieved data. Investigative tool 20 may retrieve the data stored in the repository and present the data to user 14 with the viewer. Also, in some examples, investigative tool 20 may export the data stored in the repository to be used by different tools 22. For example, after investigative tool 20 gathers data by executing a first tool 22, the gathered data may be used by a second tool 22 for further processing and analysis. Investigative tool 20 may convert the gathered data from the first tool 22 into a different format if the second tool 22 requires data in a different format.

During this process, investigative device 12 may perform one or more actions on data acquired from target computing devices 16 to normalize the data and preserve the integrity of the data. Initially, investigative device 12 may store a copy of the original data acquired from target computing devices 16. Investigative device 12 may further perform a cryptographic hash on all data at the time of acquisition, and store the resulting hash value for future comparison to verify the accuracy and integrity of the data at the time of use, e.g., within a legal proceeding. In addition, investigative device 12 may create a copy of the data in which the data is normalized to a common format to aid in the analysis. Further, investigative device 12 may instruct target computing devices 16 to compute a cryptographic hash on the data before copying the data to investigative device 12 in order to ensure the data's integrity in transit.

In some cases, investigative tool 20 may be integrated within a larger investigative software toolkit that includes additional data analysis tools for viewing and analyzing the data acquired from target computing devices 16. The data analysis tools may include, for example, a time analysis tool, a checksum verification tool, a file viewer, and network analysis tools. Investigative device 12 may acquire computer evidence from target computing devices 16 and allow user 14 to view and analyze the computer evidence online, i.e., in real-time, via the data analysis tools. In this manner, user 14 does not have to go "off-line" to analyze the acquired data. In some cases, investigative device 12 may even allow user 14 to view and analyze previously acquired computer evidence while investigative device 12 collects additional evidence. In this manner, the collection and analysis of evidence may be done in parallel, and the results from any online analysis may drive user 14 to select and perform additional evidence acquisition using other profiles and tools. For example, after viewing and analyzing a portion of the data, user 14 may determine whether acquisition of more data is necessary. Investigative device 12 further provides user 14 with the ability to acquire supplementary data in addition to the data acquired in the initial acquisition. Investigative device 12 provides user 14 with the capability to acquire additional files or additional system state data from target computing devices 16.

From the analysis of the data acquired from target computing devices 16, user 14 may determine additional steps that need to be taken after the retrieval and analysis of the computer evidence from target computing devices 16. User 14 may, for instance, determine that one or more target computing devices 16 should be seized, continue to be monitored, or do not hold the necessary data and therefore look elsewhere.

Although FIG. 1 illustrates one investigative device 12, in some examples, user 14 may connect to multiple investigative devices to interrogate target computing devices on different LANs. For example, user 14 may access a first investigative device coupled to a first LAN to acquire data from a first target computing device and access a second investigative device coupled to a second LAN to acquire data from a second target computing device. In this manner, user 14 may acquire and analyze computer evidence from multiple target computing devices 16 located on multiple LANs.

Figure 2:
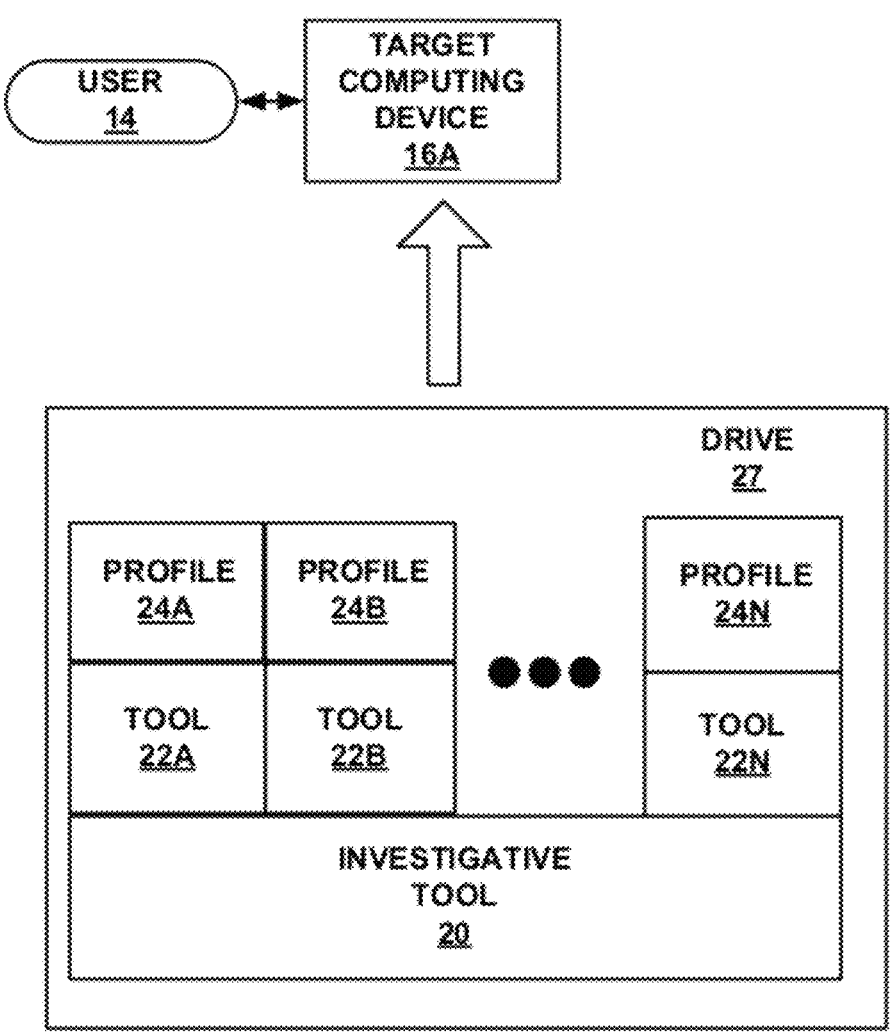
FIG. 2 is a block diagram illustrating another exemplary computer system for analysis of computer data in accordance with one example of this disclosure.

FIG. 2 is a block diagram illustrating another exemplary computer system 26 for analysis of computer data in accordance with one example of this disclosure. As illustrated, computer system 26 includes drive 27 that can be physically coupled to a target device, such as target device 16A in this example. Drive 27 provides a repository for investigative tool 20, one or more tools 22, and one or more investigative profiles 24. In this example, instead of remotely using investigative tool 20 over a network, such as customer network 18, user 14 inserts drive 27 into target computing device 16A in the example of FIG. 2. By executing investigative tool 20 directly on target computing device 16A, user 14 can perform an investigation similar to the example described above with respect to FIG. 1 without requiring that the target device be connected to customer network 18. Examples of drive 27 include, but are not limited to, a flash drive such as a Universal Serial Bus (USB) flash drive, a Read Only Memory (ROM) device, a hard drive, an electronically erasable programmable ROM (EEPROM), and the like.

In some examples, user 14 may have pre-configured drive 27 to store a number of tools 22 managed and deployed by investigative tool 20 in accordance with one or more stored investigative profiles 24. User 14 may build investigative profiles 24 offline and store investigative profiles 24 on drive 27 prior to interacting with target computing device 16A to begin the investigation. Similarly, user 14 may download one or more investigative profiles 24 from a shared repository that is securely managed by an organization in which user 14 is a member, such as a law enforcement agency. In alternate examples, user 14 may build investigative profiles 24 during the investigation after determining certain characteristics about target computing device 16A.

In the example illustrated in FIG. 2, user 14 executes investigative tool 20 with target computing device 16A. Investigative tool 20 performs the investigation by controlling the invocation and execution of the selected tools 22 in accordance with the parameters, sequence and condition handling set forth by one or more investigative profiles 24. In some examples, investigative tool 20 stores the acquired data in drive 27. In alternate examples, investigative tool 20 stores the acquired data in a remote device by causing target computing device 16A to transmit the acquired data to the remote device.

Figure 3:
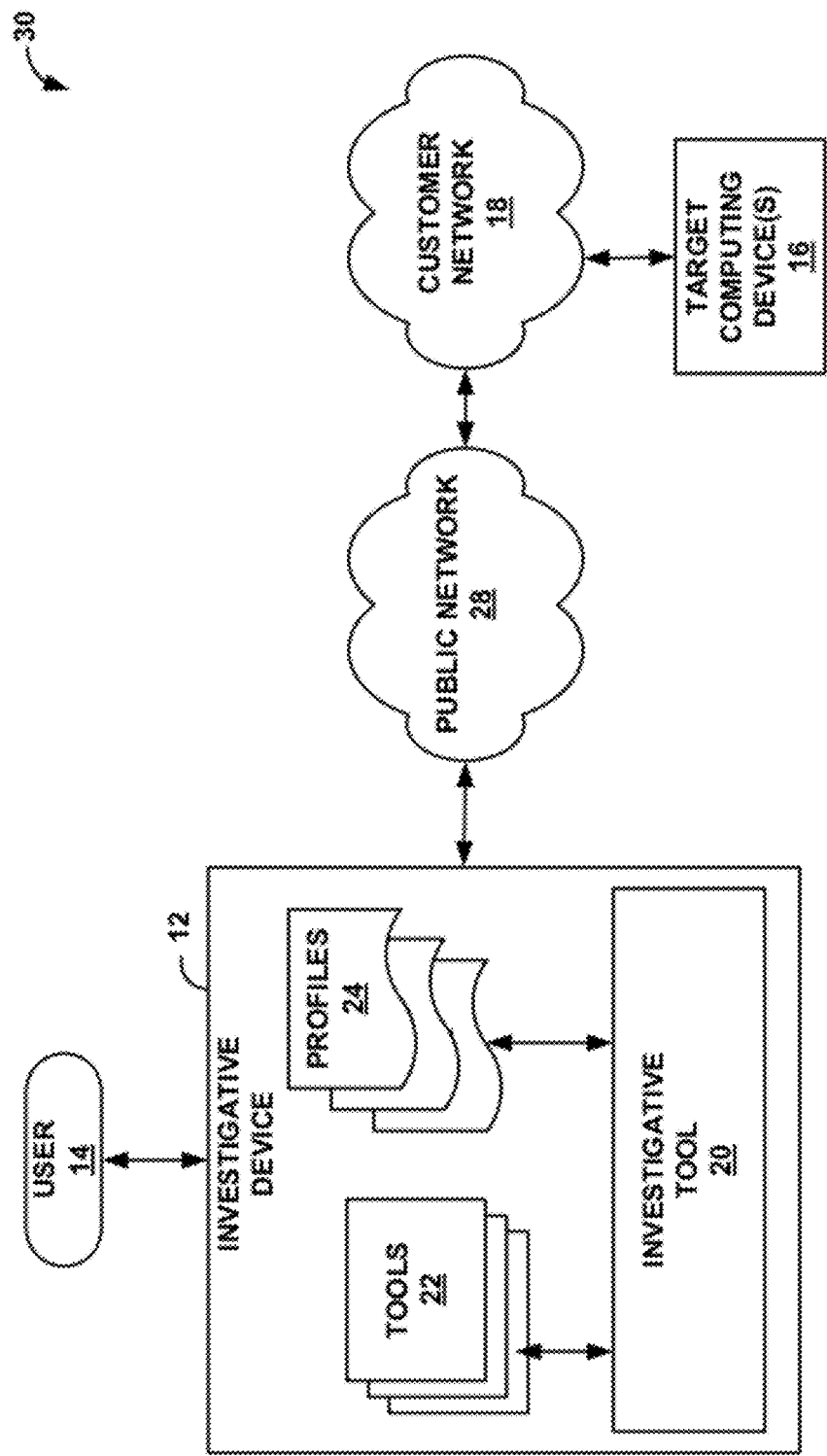
FIG. 3 is a block diagram illustrating another exemplary computer system for analysis of computer data in accordance with one example of this disclosure.

FIG. 3 is a block diagram illustrating another exemplary computer system 30 for analysis of computer data in accordance with one example of this disclosure. In this illustrated embodiment, computer system 30 conforms substantially to computer system 10 of FIG. 1, but investigative device 12 connects to target computing devices 16 via an intermediate public network 26, such as the Internet.

Figure 4:
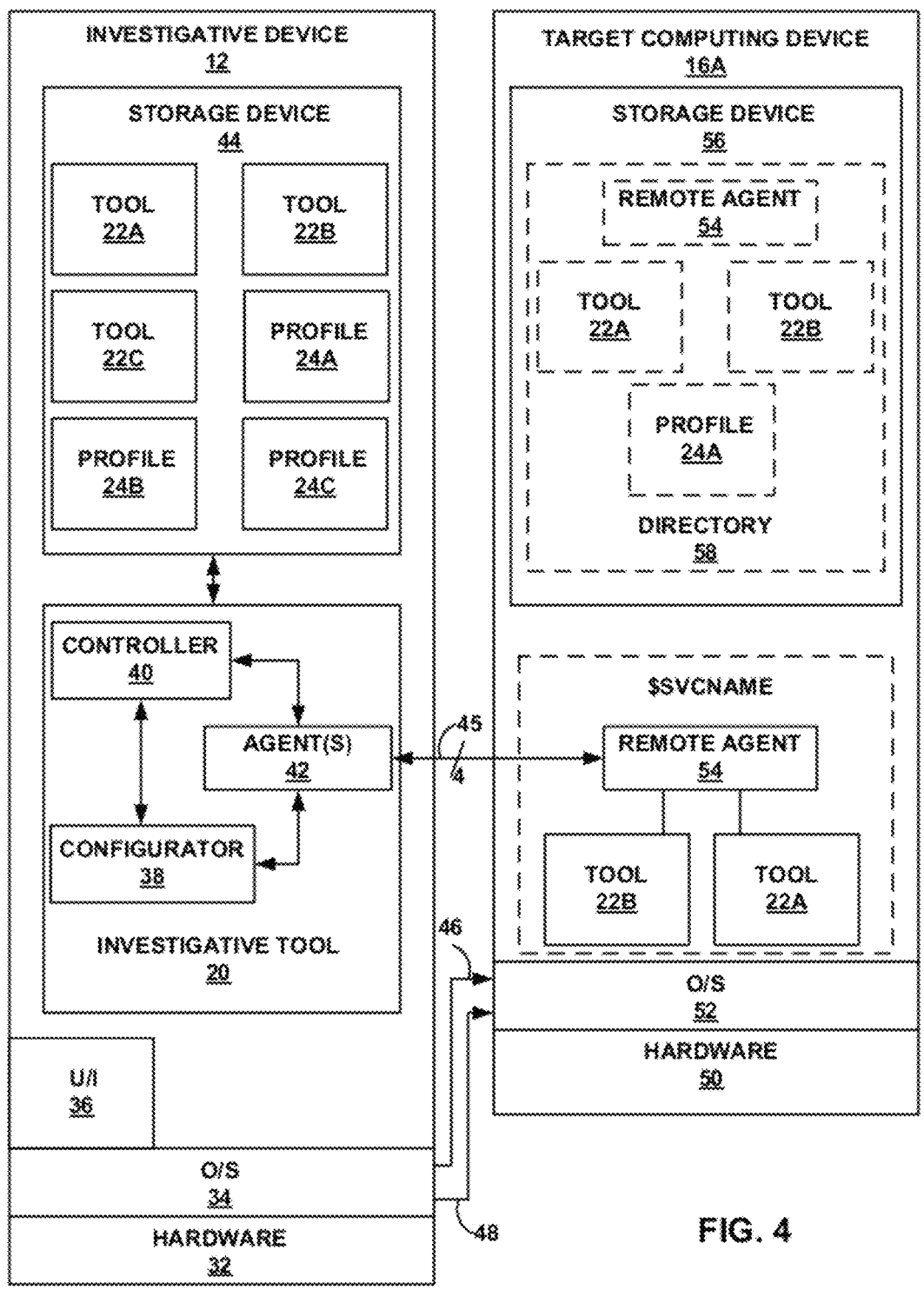
FIG. 4 is a block diagram illustrating an investigative device of FIGS. 1, 2, and 3 in further detail.

FIG. 4 is a block diagram illustrating investigative device 12 and one of target computing devices, e.g., target computing device 16A, in further detail. As illustrated, investigative device 12 includes hardware 32, operating system 34, user interface 36, investigative tool 20, and storage device 44. In some examples, prior to investigation, and after the completion of investigation, target computing device 16A includes hardware 50, operating system 52, and storage device 56. In some alternate examples, as described below, after the completion of an initial investigation, target computing device 16A may store one or more tools 22 for real-time monitoring, such as transmitting results of the monitoring on a weekly, monthly, or continuous basis, as a few examples.

Hardware 32 and hardware 50 include hardware components of investigative device 12 and target computing device 16A, respectively, for carrying out the functions of investigative device 12 and target computing device 16A. For example, hardware 32 and hardware 50 include the motherboard that includes one or more processors such as a central processing unit (CPU). The one or more processors of hardware 32 execute investigative tool 20. The one or more processors of hardware 50 execute remote agent 54, as described in more detail below. The one or more processors of hardware 32 and hardware 50 may include any one or more of a general purpose microprocessor, a digital signal processor (DSP), an application specific integrated circuit (ASIC), a field-programmable gate array (FPGA), or equivalent discrete or integrated logic circuitry.

As used in this disclosure, hardware 32 and hardware 50 also include various other hardware components such as graphics cards, network cards, and other such hardware components of investigative device 12 and target computing device 16A, respectively. Hardware 32 and hardware 50 also include transmission lines that interconnect the various hardware components to one another, e.g., buses or wires. For purposes of clarity, storage device 44 is illustrated as its own separate hardware component, but may be a part of hardware 32. Similarly, storage device 56 is illustrated as its own separate hardware component, but may be a part of hardware 50.

Operating system 34 and operating system 52 manage hardware 32 of investigative device 12 and hardware 50 of target computing device 16A, respectively, and provide services for efficient execution of various software applications, e.g., investigative tool 20, by the CPU of investigative device 12. Examples of operating system 34 and operating system 52 include, but are not limited to, Linux, Unix, and Windows. For purposes of illustration, operating system 34 is a Linux operating system, and operating system 52 is a Windows operating system. User interface 36 allows user 14 to interact with investigative device 12, e.g., execute investigative tool 20. User interface 36 may be a command line interface or a graphical user interface (GUI).

Storage device 44 may be a computer-readable storage medium that comprises instructions that cause the one or more processors of hardware 32 to perform the functions ascribed to the one or more processors of hardware 32. Storage device 44 and storage device 56 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Storage device 44 may, in some examples, be considered as a non-transitory storage medium. The term "non-transitory" indicates that the storage medium is not embodied in a carrier wave or a propagated signal. However, the term "non-transitory" should not be interpreted to mean that storage device 44 is non-movable. As one example, storage device 44 may be removed from investigative device 12, and moved to another device. As another example, a storage device, substantially similar to storage device 44, may be inserted into investigative device 12. Furthermore, the term "non-transitory" should not be interpreted to mean that the data stored on the storage device cannot change. The data stored on the storage device may change (e.g., in RAM), but the storage medium itself can still be a non-transitory medium, in some examples.

In some examples, investigative tool 20 is a Debian Linux software package with the "deb" extension. User 14 installs investigative tool 20 on investigative device 12 utilizing at least two example techniques. As one example, user 14 executes an automated installation engine by double clicking on the DEB software package. As another example, user 14 installs investigative tool 20 through command line arguments.

User 14 may operate investigative tool 20 in at least two different modes, as descried in greater detail below. In a first mode, user 14 executes investigative tool 20 from the command line of user interface 36. In a second mode, user 14 executes investigative tool 20 with a graphical user interface (GUI) of user interface 36.

As used in the disclosure, the command line refers to a text only interface with which user 14 interacts with investigative device 12 and, in some examples, with investigative tool 20. With the command line, user 14 enters a command, and concludes entering the command by pressing the enter key. A command line interpreter executes the entered command, e.g., causes investigative tool 20 to perform functions defined in the entered command. The command line interpreter may be run in a text terminal or in a terminal emulator window, as two examples.

Investigative tool 20 includes configurator 38, controller 40, and agent 42. User 14 uses configurator 38 to build investigative profiles 24. In the example of FIG. 4, user 14 uses configurator 38 to build investigative profiles 24A-24C which are stored in storage device 44. Each one of investigative profiles 24A-24C may define different manners in which investigative tool 20 should investigate one or more target computing devices 16. User 14 selects one or more of investigative profiles 24A-24C, from a set of investigative profiles 24, based on the desired investigation. In the example of FIG. 4, investigative profile 24A defines the manner in which investigative tool 20 should investigate target computing device 16A. The manner in which user 14 uses configurator 38 to build investigative profiles 24A-24C is described in greater detail below. Also, the content of investigative profiles 24A-24C is described in greater detail below.

Upon execution of investigative tool 20, controller 40 executes one or more agents 42. The number of agents 42 that controller 40 executes is based on the number of target computing devices 16 that are to be investigated. In the example of FIG. 4, investigative profile 24A indicates that one of target computing devices 16 should be investigated, e.g., target computing device 16A, and controller 40 executes one instance of agent 42, which is a software process. Controller 40 executes agent 42 to perform an investigation of target computing device 16A based in the manner defined in investigative profile 24A.

To perform the investigation, controller 40 establishes one or more communication links with target computing device 16A utilizing various techniques. As one example, controller 40 uses a Remote Command Execution Tool (RCET) to establish the communication links. Controller 40 uses programs or commands based on the type of operating system executing in investigative device 12 and target computing device 16A. To communicate between investigative device 12 and target computing device 16A, controller 40 uses the Samba program, as one non-limiting example, because operating system 34 is a Linux operating system and operating system 52 is a Windows operating system, in the example of FIG. 4.

As one non-limiting example, controller 40 invokes a Samba client, illustrated by communication link 46, to connect to target computing device 16A. The Samba client provides the user name and password for target computing device 16A, if available, and as indicated in investigative profile 24A. After connection, controller 40, using the Samba client, creates directory 58, in storage device 56, on target computing device 16A. In some examples, directory 58 may temporarily store tools 22 that are to be executed during the investigation, investigative profile 24A that defines the manner in which the investigation should be performed, and remote agent 54 that performs the investigation in the manner defined by investigative profile 24A. In the example of FIG. 4, investigative profile 24A specifies tools 22A and 22B. Controller 40 transfers remote agent 54, tools 22A and 22B, and investigative profile 24A to target computing device 16A, via communication link 46, for storage in directory 58. In some examples, tool 22A and/or 22B may require additional files or libraries to properly execute on target computing device 16A. In these examples, controller 40 may also transfer the required files or libraries to target computing device 16A, via communication link 46, for storage in temporary directory 58. Remote agent 54 is the agent that executes tools 22 specified in investigative profile 24A, e.g., tools 22A and 22B, and the manner in which tools 22A and 22B should be invoked as defined by investigative profile 24A.

In one example, the name of directory 58 is RC2_XXXXXX, where XXXX is initially 00000, as one example. If the directory RC2_00000 already exists, controller 40 increments the "00000" until a name is found that does not already exist on target computing device 16A. The path to directory 58 may be approximately %SystemRoot%\RC2_XXXXX, and the directory path to remote agent 54 may be %SystemRoot%\RC2_XXXXX\remCmd2Srv.exe. In this example, remCmd2Srv.exe is the name of remote agent 54. The directory path to remote agent 54 is referred to as $SVCPATH.

Controller 40 invokes multiple Samba tools, illustrated by communication link 48, to perform the investigation as defined by investigative profile 24A. Using the Samba tools, controller 40 creates a new service on target computing device 16A. The name of the new service may be based on the name of directory 58. For example, the name of the new service may be remCmd2SrvXXXXX, where the "XXXXX" is the same as the "XXXXX" of RC2_XXXXX, which is the name of directory 58. For ease of reference, the remCmd2SrvXXXXX service is referred to as $SVCNAME.

The $SVCNAME service may be a service that runs locally on target computing device 16A, and includes remote agent 54. Using communication link 48, controller 40 starts the $SVNAME service, which causes remote agent 54 to execute on target computing device 16A. Remote agent 54 then investigates target computing device 16A in the manner defined by investigative profile 24A. For example, remote agent 54 executes tools 22A and 22B in the sequence defined by investigative profile 24A, the specific operational parameters and manner in which tools 22A and 22B should be invoked, the specific data to capture from target computing device 16A, the manner in which results are reported and captured, and the handling of error conditions on target computing device 16A.

After tools 22A and 22B are executed, tools 22A and 22B acquire or monitor the type of data for which tools 22A and 22B are configured. Remote agent 54 transmits the acquired data back to agent 42 via network connections 45 established by remote agent 54. As illustrated in FIG. 4, in one example remote agent 54 and agents 42 establish four sockets, e.g., network connections 45, one each for input, output, error messages, and file transfer. The input socket, of network connections 45, allows user 14 to provide tools 22A or 22B any additional input which may be needed by tools 22A or 22B for execution. Tools 22A or 22B may utilize the output socket, of network connections 45, to send messages back to investigative tool 20. Tools 22A or 22B may utilize the error socket, of network connections 45, to send error messages generated by tools 22A or 22B to investigative tool 20. Tools 22A or 22B that create output files use the file transfer socket, of network connections 45, to send the file back to investigative tool 20. After all of the acquired data is transferred to agent 42, remote agent 54 closes the network connections 45.

Remote agent 54 may send an identifying "token" string as the first message on the output socket, of network connection 45, to agent 42, as one non-limiting example. Agent 42 may generate the token specific to target computing device 16A and transmit the token to remote agent 54 via communication link 48. The token may be written in a file that local agent 54 stores within directory 58. As one example, the file, in which the token is written, is an extensible markup language (XML) file. The name of the XML file is config.xml, as one example.

In some examples, remote agent 54 transmits the token string on the output socket of network connections 45. As one example, remote agent 54 concatenates the token string at the beginning of its transmission to agent 42. Agent 42 uses the received token and the Internet Protocol (IP) address of network connections 45 to authenticate that the correct one of target computing devices 16, e.g., target computing device 16A, transmitted the data.

In some examples, investigative profile 24A indicates the output file where the acquired data should be stored to ensure that the acquired data is not inadvertently stored on target computing device 16A. As one example, remote agent 54 causes the $SVCNAME service to act as a proxy to route the data to investigative device 12. To route the data to agent 42, the proxy creates a "named pipe" file on target computing device 16A. The data acquired by tools 22A and 22B is written into the named pipe created on target computing device. Remote agent 54 transmits the data in the named pipe to agent 42. Agent 42 then writes the data to the output file named in investigative profile 24A.

In some examples, remote agent 54 compresses the data in the file if investigative profile 24A defined that the data acquired from target computing device 16A should be compressed. Also, in some examples remote agent 54 encrypts the data in the file if investigative profile 24A defined that the data acquired from target computing device 16A should be encrypted. Remote agent 54 may also output the data in the manner defined by investigative profile 24A, e.g., raw format or XML format, as described in more detail below.

Upon reception of the data, investigative tool 20 may be configured to perform additional reporting functions. For example, after the completion of the investigation, investigative tool 20 may e-mail an alert to user 14. As another example, during the investigation, if the retrieved data indicates that some immediate action should be performed, investigative tool 20 may immediately report to user 14 indicating that user 14 should perform some immediate action. For instance, if the received data indicates that an intrusion agent is executing on target computing device 16A, investigative tool 20 may immediately report to user 14, via an e-mail, that user 14 should contact the user of target computing device 16A and request that the user immediately turn-off target computing device 16A.

In some examples, for instance in the context of a forensic investigation, it may be advantageous to user 14 that the user of target computing device 16A not know that target computing device 16A is being investigated because data collected from target computing device 16A could be used to prosecute the user of target computing device 16A in criminal or civil court. Knowledge of the investigation may allow the user of target computing device 16A to proactively delete forensic evidence. By ensuring that the user of target computing device 16A is not knowledgeable of the investigations, the user of target computing device 16A is less likely to proactively delete forensic evidence. Also, by ensuring that the user of target computing device 16A is not knowledgeable of the investigations, user 14 can acquire data from target computing devices 16 repeatedly and over a period of time because the user of target computing device 16A may not know about the investigations. It may be beneficial for user 14 to perform multiple investigations to acquire forensic evidence that is added after a previous investigation.

To ensure that user of target computing device 16A is not aware that he or she is being investigated, remote agent 54 prevents any errors, which may occur during investigation, to appear on target computing device 16A. As one non-limiting example, to prevent errors from appearing on target computing device 16A, remote agent 54 executes the SetErrorMode(SEM_FAILCRITICALERRORS|SEM_ NOOPENFILEERRORBOX) library function, which may be a command used by O/S 52. In this manner, if an error occurs during the investigation, the user of target computing device 16A may be oblivious to the errors. If the errors are outputted, the user of target computing device 16A may become knowledgeable that an investigation is currently being performed.

In some examples, to ensure that the user of target computing device 16A does not know that target computing device 16A is being investigated, remote agent 54 deletes all fingerprints of the investigation. For example, at the conclusion of the investigation, remote agent 54 ends the $SVCNAME service, deletes directory 58 and all files within the directory, e.g., tools 22A and 22B and investigative profile 24A. Remote agent 54 also deletes itself from target computing device 16A.

For remote agent 54 to delete itself, remote agent 54 marks itself as "stopped," at the conclusion of the investigation. As one non-limiting example, after marking itself as stopped, remote agent 54 executes a new copy of itself with the "-deleteself$PID" arguments. When the executed copy of remote agent 54 is started from the "-deleteself$PID" arguments, the executed copy waits for $PID to exit (via the OpenProcess( ) and WaitForSingleObject( ) library functions), then runs "cmd.exe/crmdir/s/q$REMTOP" via execl( ) in order to delete the directory 58 and all of the contents within directory 58.

In some of the examples described above, the various executables, e.g., tools 22A and 22B and remote agent 54, need not be pre-loaded on to target computing device 16A. In other words, prior to beginning the investigation, user 14 or some other entity, does not need to pre-load any investigation executable on target computing device 16A. In this manner, users of target computing devices 16 may be unaware that their target computing devices 16 could be investigated. The various executables are transferred over, temporarily stored and temporarily executed, and deleted at the conclusion of the investigation.

In some alternate examples, tools 22A and 22B, remote agent 54, investigative profile 24A, and directory 58 may not be deleted immediately after an investigation. In these examples, tools 22A and 22B, remote agent 54, investigative profile 24A, and directory 58 may reside permanently in target computing device 16A, or may be deleted after some pre-defined period of time, and not immediately after an investigation. For example, user 14 may desire to continuously investigate target computing device 16A for an indefinite or specified period of time. In these examples, investigative profile 24A may define instances when remote agent 54 should execute tools 22A and 22B and instances when remote agent 54 should report the results back to investigative tool 20.

For example, investigative profile 24A may define a random sampling over a period of time, e.g., a week, month, or indefinitely, when tools 22A and 22B should report results back to investigative tool 20. This may allow user 14 to monitor target computing device 16A in real-time. For instance, tool 22A may be configured to detect a signature of an intrusion agent. Investigative profile 24A may define that remote agent 54 should execute tool 22A continuously, and should report the results of tool 22A as soon as tool 22A detects the intrusion agent. With real-time monitoring, investigative tool 20 may immediately receive data that an intrusion agent is stored or executing on target computing device 16A.

As another example, tool 22B may be configured to monitor the e-mails sent from target computing device 16A. In this example, tool 22B may be configured to send data back to investigative tool 20 when the e-mail is addressed to some specified entities that the user of investigative tool 20 should not be e-mailing. In this example, investigative tool 20 may receive data that the user of target computing device 16A is e-mailing prohibited entities.

As described above, remote agent 54 investigates target computing device 16A in the manner defined by investigative profile 24A. The following is some example content of investigative profile 24A. The following examples are described from the perspective of investigative tool 20. In the following examples, it should be understood that investigative tool 20 includes agent 42 and remote agent 54. Investigative tool 20 is the master tool that causes remote agent 54 to perform its functions. In this sense, remote agent 54 is a slave to the direction of investigative tool 20. Moreover, although the following examples are described with respect to investigative profile 24A, it should be understood that other investigative profiles 24 may include similar content, but for different types of desired investigations.

As described above, investigative profile 24A defines that tools 22A and 22B, from a set of tools 22, should be executed on target computing device 16A. Tools 22A and 22B may be third-party or self-created tools. Each one of tools 22A and 22B may be configured to acquire different types of data, and user 14 may build investigative profile 24A to set out tools 22A and 22B based on the type of data that user 14 wants investigative tool 20 to acquire or monitor. Investigative profile 24A may also define the sequence, duration, and frequency in which tools 22A and 22B should be executed on target computing device 16A.

In addition to setting out which tools 22 investigative tool 20 should execute, investigative profile 24A may also indicate whether any additional operational parameters are needed by tools 22A and 22B. For example, tool 22A may require additional files or libraries to execute properly on target computing device 16A. In these instances, investigative profile 24A may define which files or libraries are needed, and the location for the needed files or libraries. In this manner, investigative tool 20 can ensure that the needed files or libraries are available for tool 22A by transferring the files or libraries to target computing device 16A ahead of executing tool 22A.

As described above, investigative tool 20 executes tools 22A and 22B on target computing device 16A. In some examples, target computing device 16A may already store tool 22A or 22B; however, this may not be the case in every instance. Investigative profile 24A may need to define whether tool 22A or 22B needs to be copied over to target computing device 16A so that tools that are not already stored in target computing device 16A can be copied over and executed.

For the benefit of user 14, user 14 may desire to provide a short description of what actions the set out tools 22 perform. Investigative profile 24A allows user 14 to provide a description of the functions of tools 22A and 22B for ease of review.

In some examples, investigative profile 24A may indicate which ones of target computing devices 16 to investigate, and whether investigative tool 20 should acquire data from a plurality of target computing devices 16 in parallel or in sequence. Investigative profile 24A may allow user 14 to provide a concurrency value. The concurrency value defines how many target computing devices 16 investigative tool 20 should investigate. As described in more detail, the number of agents 42 that controller 40 executes is based on the concurrency value set in investigative profile 24A.

To identify which ones of target computing devices 16 to investigate, investigative profile 24A may include the address and connection information for one or more target computing devices 16. In the example of FIG. 4, investigative profile 24A includes the address and connection information for target computing device 16A. For example, investigative profile 24A provides the host name of target computing device 16A, an IP address of target computing device 16A, the type of operating system run on target computing device 16A, e.g., operating system 52, username, and password for accessing target computing device 16A. User 14 may obtain information such as host name, type of operating system, username, and password prior to the investigation. User 14 may obtain other information such as the IP address during the investigation.

In some examples, investigative profile 24A may define where to store the acquired data. For example, tool 22A may require user 14 to specify the name of the file where the acquire data should be stored. To avoid storing the acquired data in an output file on target computing device 16A, investigative profile 24A includes arguments and a file name on investigative device 12 so that when investigative tool 20 executes tool 22A, the results are not stored on target computing device 16A. The location where investigative tool 20 stores the acquired data may be referred to as a repository. The repository may be part of storage device 44, or external to investigative device 12.

Investigative profile 24A may also define the format in which the acquired data should be stored. The format in which investigative tool 20 stores the acquired data may be raw format, or some other common file format, e.g., XML format. Raw format is the direct output of tools 22. To investigate multiple target computing devices 16 in parallel, investigative tool 20 executes multiple agents 42 for each target computing device 16. When investigative profile 24A specifies the raw format, the acquired data from each target computing device 16 may be concatenated together making it difficult for user 14 to determine which data was acquired from which target computing device 16. When investigative profile 24A specifies XML format, investigative tool 20 may name each execution of agents 42 individually and store the data for each execution of agents 42 in XML format making it easier for user 14 to determine which data was acquired from which target computing device 16.

Investigative profile 24A may also define whether the acquired data should be encrypted and/or compressed. If investigative profile 24A indicates encryption, investigative tool 20 may apply secured socket layer (SSL) encryption. If investigative profile 24A indicates compression, investigative tool 20 may compress the acquired data using the zlib library.

Investigative profile 24A may also define for how long and when investigative tool 20 should execute tools 22A and 22B on target computing device 16A, e.g., the duration of the investigation. As one example, investigative profile 24A indicates that the investigation is a transient investigation, e.g., non-continuous investigation. For instance, investigative profile 24A indicates the frequency or time span within which investigative tool 20 executes tools 22A and 22B, e.g., how many times a day or for how long investigative tool 20 executes tools 22A and 22B on target computing device 16A. As another example, investigative profile 24A indicates that the investigation is a permanent investigation, e.g., continuous investigation.

In some examples, investigative profile 24A defines actions that investigative tool 20 should perform, to execute tools 22A and 22B, based on the status of target computing device 16A. For example, investigative profile 24A may define how investigative tool 20 should proceed in the event that target computing device 16A crashes, is rebooted, is turned off, or becomes inaccessible. As an example, remote agent 54 can install itself as a persistent service that would be executed when target computing device 16A is rebooted. As yet another example, investigative profile 24A may define what actions investigative tool 20 should perform if tool 22A or 22B cannot be executed on target computing devices 16 that are currently under investigation.

For example, investigative profile 24A may indicate that investigative tool 20 should not execute tool 22A or 22B, e.g., block tools 22A or 22B. As another example, investigative profile 24A may indicate that investigative tool 20 should skip tool 22A or 22B if either cannot be executed. As another example, investigative profile 24A may indicate that investigative tool 20 should notify user 14 that tools 22A or 22B cannot be executed. In some examples, in addition to notifying user 14, investigative profile 22A may indicate that investigative tool 20 should request for instructions from user 14 in the event that tools 22A or 22B cannot be executed.

Investigative profile 24A may be a file in the INI file format, with the extension .ini. There may be two sections to investigative profile 24A. One example of one of investigative profiles 24 is provided in FIG. 5. One section is the "options" section, and the other section is the "labels" section. The labels section indicates which tools 22 should be executed on one or more target computing devices 16. The labels section may also indicate the manner in which the specified tools 22 should be invoked. The labels section may not specify other labels; however, examples of this disclosure should not be considered so limited. In some examples, user 14 combines related tools 22 under a common label. For example, user 14 could combine all process-related tools 22 under a "Process Utilities" label.

The manner in which investigative tool 20 should invoke one or more tools 22 may be defined by tags in the labels section. For example, investigative profile 24A may define a tag that indicates to which output file investigative tool 20 should output the data acquired by the execution of one or more tools 22. As another example, investigative profile 24A may define a tag that indicates what functions investigative tool 20 should implement when investigative tool 20 encounters an error when executing one or more tools 22 on one or more target computing devices 16. For example, investigative agent 24A may define what functions investigative tool 20 should implement when target computing device 16A shuts down, crashes, is rebooted, and other similar errors which investigative tool 20 may encounter.

Table 1 describes some of the example tags, of a labels section, that may be included in investigative profile 24A. The description section of Table 1 corresponds to some of the example content of investigative profile 24A described above. There may be more tags than those described in Table 1. Moreover, investigative profile 24A need not include all of the tags described in Table 1. In some examples, the command tag may be required, while the other tags may not be required.

TABLE 1

| TAG | VALUE | DESCRIPTION |
| --- | --- | --- |
| command | string | The command tag specifies one of tools 22 that investigative tool 20 should execute. If the tool 22 is to be copied to one or more target computing devices 16, the command value may indicate the path needed to find the tool 22 on investigative device 12. |
| arguments | string | The arguments tag specifies any command-line arguments that should be passed to the command. For example, the arguments tag may specify where the output file, from the investigation, should be stored. |
| copy | true or false | The copy tag specifies whether the tool 22 indicated by the command tag should be copied to the target computing device 16, currently being investigated. For example, if true, the tool 22 should be copied. If false, the tool 22 should not be copied. |
| needs | string | The needs tag specifies any additional files that the tool 22, identified by the command tag, may need to execute on the target computing device 16, currently being investigated. |
| description | string | The description tag specifies a short, plain-text description of what the tool 22, identified by the command tag, does. |
| filearg | string | The filearg tag specifics the file name for the file that investigative tool 20 temporarily generates on target computing devices 16 to temporarily store the acquired data. If user 14 specifies the file name, user 14 may need to indicate in the arguments tag that investigative tool 20 should temporarily generate a file on target computing devices 16 which are to be investigated. |

The option section defines values that affect all of tools 22 identified in the labels section. Table 2 describes some of the example tags, in the option section, that may be included in investigative profile 24A. The description section of Table 2 corresponds to some of the example content of investigative profile 24A described above. Table 2 is provided for illustration purposes and should not be considered as limiting. There may be more tags than those described in Table 2. Moreover, investigative profile 24A need not include all of the tags described in Table 2.

herein, investigative tool 20 allows user 14 to generate investigative profile 24B according to his or her investigative needs, potentially based on specific conditions presented by a target device. In some examples, user 14 generates investigative profile 24B using a text editor. In some alternate examples, user 14 generates investigative profile using a GUI of investigative tool 20. Configurator 38 provides the text editor or GUI with which user 14 builds investigative profile 24B.

TABLE 2

| TAG | VALUES | DEFAULT | DESCRIPTION |
| --- | --- | --- | --- |
| output-format | raw or xml | raw | When "xml" is specified, investigative tool 20 outputs the acquired data in wrapped XML tags for future parsing. In some examples, the output data is base64 encoded. When "raw" is specified, investigative tool 20 does not output the data in wrapped XML tags. The acquired data may be stored in a repository of storage device 44. Also, output-format tag may instruct investigative tool 20 to convert the acquired data into a common file format. In this manner, the acquired data stored in the repository may be in a common file format regardless of which ones of tools 22 acquired the data. |
| encrypt | true or false | false | When true, communication between investigative device 12 and one or more target computing devices 16 is encrypted. As one example, the encryption may be secured socket layer (SSL) encryption. When false, communication between investigative device 12 and one or more target computing devices 16 is not encrypted. |
| compress | true or false | false | When true, investigative tool 20 compresses the acquired data before investigative device 12 receives the data. As one example, investigative tool 20 may compress the data utilizing zlib compression techniques. Compression may be useful when the output-format tag is specified as XML. When false, investigative tool 20 does not compress the acquired data. |
| concurrency | integer | 1 | The concurrency tag defines the number of target computing devices 16 that should be investigated. |

FIG. 5 is an example illustration of one of investigative profiles 24, e.g., investigative profile 24B. As described The example of investigative profile 24B is provided for illustration purposes, and should not be considered as limiting. For example, not every example of investigative profiles 24 includes all of the tags illustrated in FIG. 5. Also, the arguments of the tags may be different in different examples of investigative profiles 24.

Investigative profile 24B includes options section 60 and labels section 62. In the example of FIG. 5, options section 60 indicates that one of target computing devices 16 will be investigated, e.g., the concurrency tag is 1. Options section 60 also indicates that the retrieved data should not be encrypted, should not be compressed, and should be received in the "raw" format, as described above, e.g., the encrypted tag is false, the compress tag is false, and the output-format tag is raw.

Labels section 62 includes label 64A-64E (collectively referred to as "labels 64"). Labels 64 include a command tag, an arguments tag, a needs tag, a copy tag, an on_error_tag, a description tag, and a filearg tag, as described above with respect to Table 1. As illustrated in FIG. 5, not all tags need arguments. For purposes of illustration, the tags of label 64A are described in more detail.

Label 64A includes the command tag which specifies which one of tools 22 investigative tool 20 should execute. Controller 40 configures remote agent 54 to execute the tool 22 specified by the command tag of label 64A. In this example, the command tag of label 64A specified the "mdd.exe," which is one example of tools 22. The command tag also indicates where the "mdd.exe" tool is stored.

The arguments tag, of label 64A, indicates any command-line arguments that should be passed to remote agent 54. In this example, the arguments tag indicates that output file, where the data is to be stored, is defined by the filearg tag, e.g., "-o FILEARG." The needs tag, of label 64A, indicates whether the mdd.exe tool requires any additional files for execution. As illustrated, the needs tag, of label 64A, is empty, indicating that the mdd.exe tool does not require any additional files for execution.

The copy tag, of label 64A, indicates whether the mdd.exe tool needs to be copied to target computing devices 16 that will be investigated. In this example, the argument of the copy tag is true. When the argument of the copy tag is true, the tool called out by the command tag needs to be copied to target computing devices 16. The on_error tag, of label 64A, indicates what actions investigative tool 20 should perform when investigative tool 20 encounters an error when executing mdd.exe. In this example, the argument for the on_error tag is continue, which indicates to investigative tool 20 that it should proceed to the next step when it encounters an error, and to not stop its process.

The description tag, of label 64A, provides a brief description of the functions performed by the mdd.exe tool. In this example, the mdd.exe tool acquires an image of the RAM of one of target computing devices 16. The filearg tag, of label 64A, indicates the file name that investigative tool 20 generates on investigative device 12 to store the acquired data. In this example, the file name is memory.dmp.

As described above, user 14 uses configurator 38 to build investigative profiles 24. The following describes two example techniques to build investigative profiles 24. In one example, configurator 38 employs the command line interface with which user 14 builds investigative profiles 24, as described in more detail below. In another example, configurator 38 employs a GUI with which user builds investigative profiles 24, as described in more detail below with respect to FIGS. 7-13.

Figure 6:
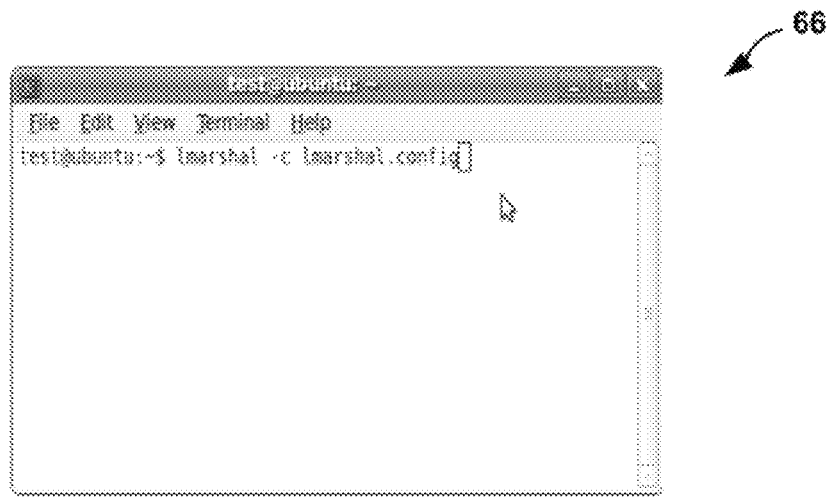
FIG. 6 is a screen illustration of an example of a window for executing an investigative tool with a command line.

In the command line interface technique, user 14 executes investigative tool 20 with the command line interface. Execution of investigative tool 20 with the command line interface is referred to as text-only mode. In the text-only mode, user 14 opens a command line and enters the executable name for investigative tool 20. FIG. 6 is a screen illustration of an example window 66 showing execution of investigative tool 20 with a command line interface. User 14 enters the executable name for investigative tool 20. In the example of FIG. 6, the name of investigative tool 20 is "lmarshal," which stands for Live Marshal. User 14 may also enter the name of investigative profile 24 in the command line. In the example of FIG. 6, the name of investigative profile 24 is "lmarshal.config." If user 14 does not enter the name of one or more investigative profiles 24, investigative tool 20 may utilize an investigative profile provided with the software package that includes investigative tool 20.

User 14 may also enter any options which user 14 desires, which function to form the one or more investigative profiles 24. For example, configurator 38 allows user 14 to enter flags with which user 14 builds investigative profiles 24. One example of the flags entered by user 14 is -i<file>-t [OPTIONS][domain\]user@host<label>, which is different from the flag illustrated in FIG. 6 to illustrate text-only mode. Configurator 38 allows user 14 to call out pre-built investigative profiles 24 and update the pre-built investigative profiles 24 as needed. Configurator 38 may also allow user 14 to build the investigative profiles 24 after user 14 executes investigative tool 20.

The -t flag indicates text-only mode. In the previous example, the -i<file> flag indicates the name of an investigative profile 22. The "domain" string allows user 14 to provide an optional domain name. The "user" string allows user 14 to enter the username and password for one of target computing devices 16, e.g., target computing device 16A. The "host" string is the hostname or IP address of target computing device 16A, in this example.

The <label> flag indicates the name of a label within investigative profile 24 that controller 40 should use to configure investigative tool 20. For example, the <label> flag may indicate label 64A of investigative profile 24, in the example illustrated in FIG. 5. In some examples, there may be multiple <label> flags, each indicating a label of investigative profile 24, e.g., labels 64A-64E.

The [OPTIONS] flag allows user 14 to enter additional optional commands that investigative tool 20 should implement. With the [OPTIONS] flag, configurator 38 allows user 14 to build investigative profiles 24. In some examples, the [OPTIONS] flag may be overridden. The [override] flag in Table 3 indicates an option that overrides the corresponding tag within investigative profile 24. In examples where user 14 enters conflicting flags, the latter entered override flag may control; however, aspects of this disclosure are not so limited. For example, if user 14 enters a flag that indicates the data should be compressed, followed by a flag that indicates the data should not be compressed, the data may not be compressed because the flag that indicates the data should not be compressed is the latter flag. Table 3 provides non-limiting examples of the [OPTIONS] flags, including [override] flags. It should be understood that the [override] flags described in Table 3 are provided for illustration purposes. Furthermore, user 14 may not need to use any of the [override] flags.

TABLE 3

| FLAG | VALUE | DESCRIPTION |
| --- | --- | --- |
| -p | password=<password> | User 14 can enter the password for target computing devices 16. If omitted, investigative tool 20 may prompt user 14 to provide the password. |
| -o | output-dir=<file> | User 14 can enter the file where the output should be written to. |
| -e | encrypt [override] | The network connections 45 are encrypted, even if investigative profile 24 indicates that they are unencrypted. |
| -n | plaintext [override] | The network connections 45 are unencrypted, even if investigative profile 24 indicates that they are encrypted. |
| -z | compress [override] | The data sent between investigative device 12 and target communication devices 16 is compressed, even if investigative profile 24 indicates no compression. |
| -u | uncompress [override] | The data sent between investigative device 12 and target communication devices 16 is not compressed, even if investigative profile 24 indicates compression. |
| -x | XML [override] | The output generated from the execution of tools 22 will be formatted with XML, even if investigative profile indicates "raw" formatting. |
| -r | raw [override] | The output generated from the execution of tools 22 will not be formatted, even if investigative profile indicates "XML" formatting. |
| -m | md5 | Investigative tool 20 will perform an MD 5 hash on the acquired data. |
| -s | sha1 | Investigative tool 20 will perform a SHA-1 hash on the acquired data. |
| -f | hash_file=HASHFILE | Specifies the file name where the hashes are saved. It is used with -m or -s, and may be ignored if -m or -s flags are not provided. |
| -b | batch=<batch file> | User 14 can cause investigative tool 20 to operate in batch mode, e.g., acquire data from multiple target computing devices 16. <batch file> specifies a file that contains connection information for the multiple target computing devices 16. |
| -c | count=<num> | User 14 can specify the number of target computing devices 16 investigative tool 20 should investigate. The -c flag may only be valid with the -b flag. |
| -l | list | User 14 can cause investigative tool 20 to list available tools 22. After listing available tools 22, investigative tool 20 may close. |

Figure 7:
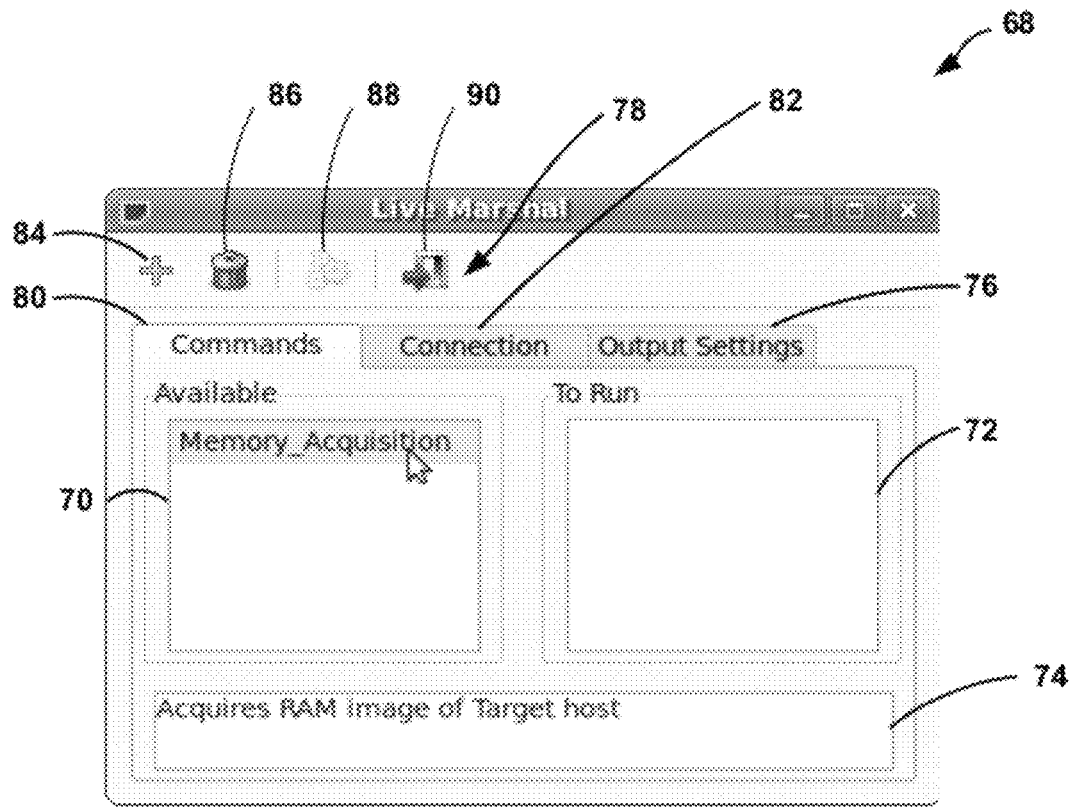
FIG. 7 is a screen illustration of an example of a window that appears when a user launches an investigative tool.

FIGS. 7-13 illustrate example techniques for user 14 to build investigative profiles 24 using a GUI. The GUI may be one example of configurator 38. FIG. 7 is a screen illustration of an example of window 68 that appears when user 14 launches investigative tool 20. Configurator 38 allows user 14 to build investigative profiles 24 by interacting with window 68. Window 68 includes toolbar 78, Commands tab 80, Connection tab 82, and Output Settings tab 76. As one example, investigative tool 20 initially selects Commands tab 80, when window 68 is displayed.

Toolbar 78 may be a global tool bar that is viewable whether user 14 selects any of Commands tab 80, Connection tab 82, and Output Settings tab 76. Toolbar 78 includes Add Command icon 84, Delete icon 86, Execute icon 88, and Exit icon 90. When user 14 selects Add Command icon 84, user 14 can add one of tools 22 to Available window 70. When user 14 selects Delete icon 86, user 14 can delete tools 22 from Available window 70. When user selects Execute icon 88, investigative tool 20 performs an investigation as described above. Execute icon 88 may only become selectable after user 14 completes the build of one or more investigative profiles 24. When user 14 selects Exit icon 90, user 14 exits investigative tool 20.

Commands tab 80 includes Available window 70, To Run window 72, and Description window 82. Available window 70 presents a list of available tools 16 to execute on one or more target computing devices 16. To select which tools 22, from the set of listed tool 20, to execute, user 14 selects one or more presented tools 22 and drags them to the To Run window 72. To Run window 72 holds the selected tools 22 for eventual transfer and execution on one or more target computing devices 16. Description window 74 allows user 14 to presents a brief description of tools 22.

In some examples, the tool 22 that user 14 wants to invoke may not be listed in Available window 70. In these instances, user 14 selects Add Command icon 84 of toolbar 78. User 14 is then presented with a window to add the tool 22 in the Available window 78.

FIG. 8 is a screen illustration of an example of window 92 with which user 14 can add one of tools 22. User 14 uses window 92 to build investigative profiles 22. As illustrated in FIG. 8, user 14 is provided an input box to enter the name and path of one of tools 22 that investigative tool 20 should implement, e.g., name and path of tool 22A. To enter the path of tool 22A, investigative tool 20 may present another window described in further detail in FIG. 9.

Window 92 may also allow user 14 to enter the manner in which tool 22A should be implemented. As illustrated, window 92 presents a check box to indicate whether tool 22A needs to be temporarily copied onto one or more target computing devices 16. Window 92 also presents a check box to indicate the function of investigative tool 20 if investigative tool 20 encounters an error when executing tool 22A, e.g., halt on error check box.

Window 92 also allows user 14 to populate tags of the labels section of investigative profile 22A. For example, window 92 presents input boxes for the arguments tag, filearg tag, libraries tag, and description tag. The arguments tag, filearg tag, and description tag are similar to the corresponding tags described above in Table 1. When user 14 selects the File Arg . . . button, user 14 may enter flags and the output filename where the acquired data should be stored, as illustrated in FIG. 10. The libraries tag is similar to the needs tag described above in Table 1. User 14 may not need to fill in all of the input boxes illustrated in FIG. 8. In this manner, user 14 may build investigative profile 24 to define the manner in which investigative tool 20 invokes tool 22A.

FIG. 9 is a screen illustration of an example of a window 94 to enter the path name for one of tools 22. As illustrated in FIG. 9, user 14 can select the path to the tool 22 called out in the name input box of window 92. After selecting the path, user 14 may then fill in the rest of the input boxes illustrated in FIG. 8. After filling in the rest of the required input boxes illustrated in FIG. 8, available window 78 presents the called out tool 22, e.g., tool 22A.

FIG. 10 is a screen illustration of an example of a window 96 to enter the output filename where the acquired data should be stored. Window 96 includes a flag input box and file name input box. User 14 enters the same flags that he or she entered in the arguments tag. For example, as illustrated in FIG. 10, user 14 enters the -x, -w, and -o flags. The flags may be specific to tools 20 that investigative tool 20 executes, and may not correspond to the flags in Table 3. User 14 enters the name of the output file in the file name input box, e.g., output.txt.

Figure 11:
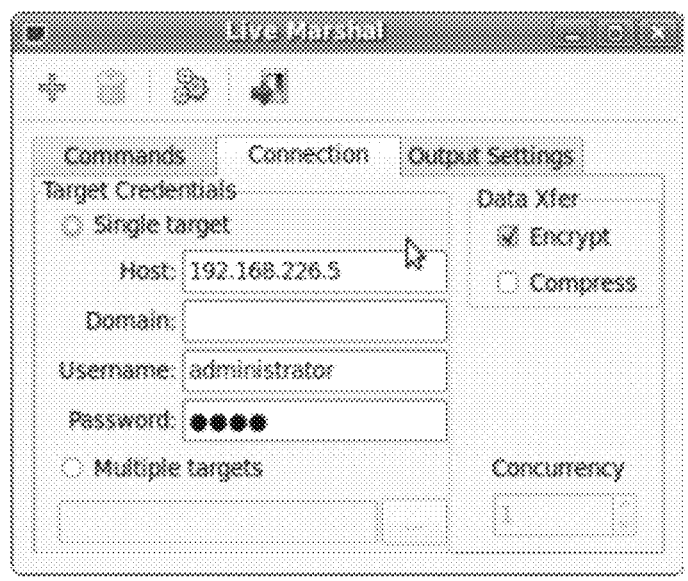
FIG. 11 is a screen illustration of an example of a window that appears after a user selects a connection tab.

User 14 may then select the Connection tab 82 to indicate which ones of target computing devices 16 should be investigated. FIG. 11 is a screen illustration of an example of window 98 that appears after user 14 selects Connection tab 82. Window 98 further allows user 14 to build investigative profiles 24. As illustrated, window 98 allows user 14 to select either a single one of target computing devices 16 to investigate, or a plurality of target computing devices 16 to investigate. In this example, user 14 selected a single one of target computing devices 16 to investigate.

When user 14 selects a single one of target computing devices 16 to investigate, user 14 enters the host name of the single one of target computing devices 16. In this example, the host name is the IP address. User 14 may, optionally, enter the domain name. User 14 also enters the username and password for the target computing device 16 that corresponds to the host name.

Window 98 also provides the encrypt and compress check boxes. If user 14 desires the acquired data to be encrypted or compressed, user 14 selects the appropriate check boxes. The encrypt and compress check boxes correspond to the encrypt and compress tags described in Table 1.

User 14 selects multiple target computing devices 16 to investigate by selecting the multiple targets radio button illustrated in window 98. If user 14 selects the multiple targets radio button, user 14 identifies which ones of target computing devices 16 should be investigated in a text file, as described in more detail with respect to FIG. 12. User 14 enters the location of the text file in the input box below the multiple targets circle. User 14 may also indicate whether investigative tool 20 should investigate multiple target computing devices 16 in sequence or in parallel by selecting the appropriate number in the concurrency box. If the concurrency box indicates 1, then investigative tool 20 investigates the identified target computing devices 16 in sequence. If the concurrency box indicates the number of identified target computing devices 16, then investigative tool 20 investigates the identified target computing devices 16 in parallel. If the concurrency box indicates a number that is greater than 1 but less than the number of identified target computing devices 16, then investigative tool 20 investigates the number of identified target computing devices 16, indicated in the concurrency box, in parallel, until all identified target computing devices 16 have been investigated.

Figure 12:
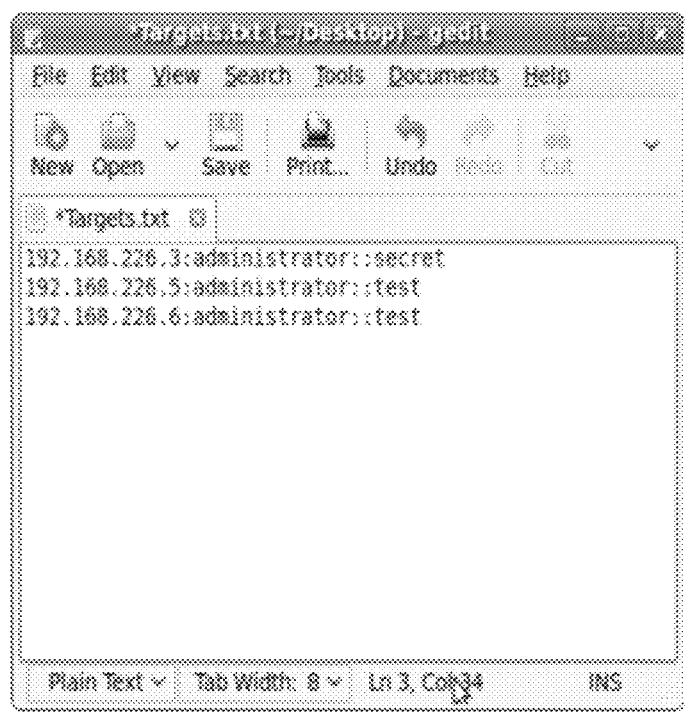
FIG. 12 is a screen illustration of an example of a text file that identifies a plurality of target computing devices that should be investigated.

FIG. 12 is a screen illustration of an example of text file 100 that identifies a plurality of target computing devices 16 that should be investigated. In the illustrated example, user 14 selected three target computing devices 16 for investigation. Text file 100 includes the host name for each identified one of target computing devices 16, e.g., the IP address. Text file 100 also includes the username and password for each identified one of target computing devices 16.

Figure 13:
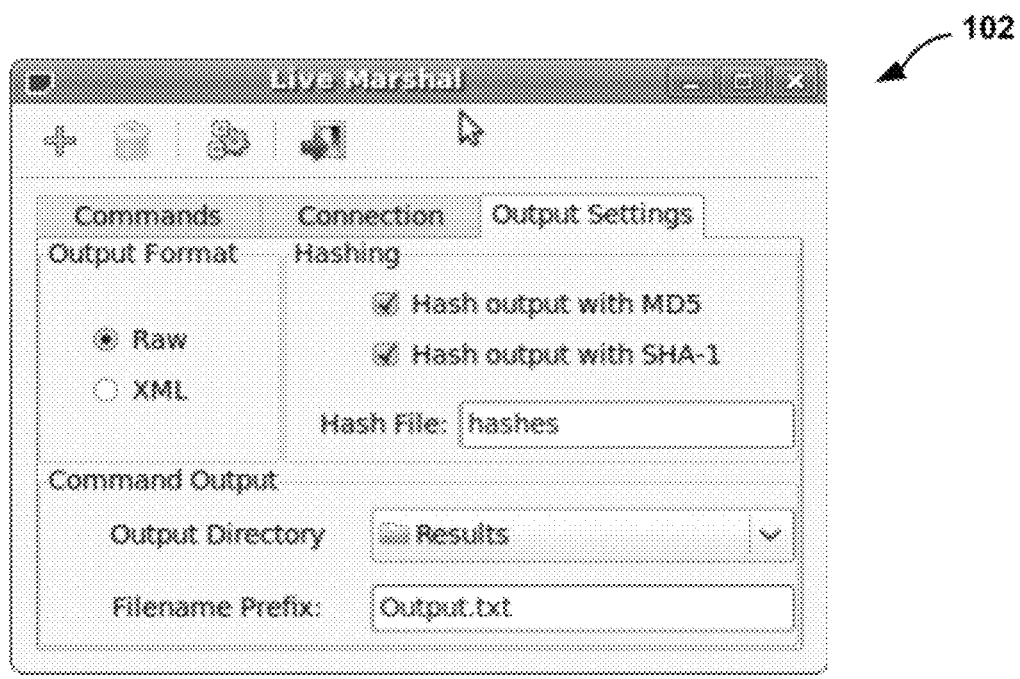
FIG. 13 is a screen illustration of an example of a window that appears after a user selects an output settings tab.

User 14 selects the Output Settings tab 76 to define the manner in which the acquired data should be outputted. FIG. 13 is a screen illustration of an example of window 102 that appears after user 14 selects Output Settings tab 76. User 14 can select whether the output data should be in the raw format or XML format. User 14 can also select whether any hashing should be performed, which type of hashing, and where the hash file should be stored if hashing is selected. User 14 can also enter the output directory name and the filename where the acquired data should be stored, e.g., the results directory and the filename is output.txt.

Figure 14:
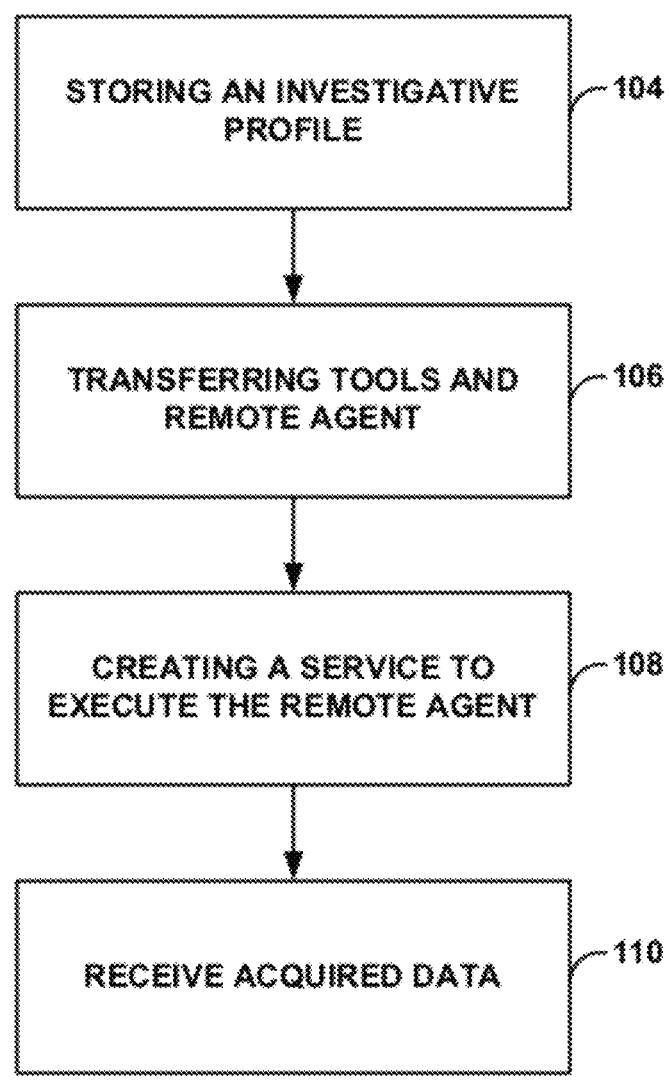
FIG. 14 is a flow diagram illustrating an example operation of a computer system in acquisition of computer data from one or more target computing devices.

FIG. 14 is a flow diagram illustrating an example operation of system 10 in acquisition of computer evidence from one or more target computing devices 16. For purposes of illustration, reference is made to FIG. 4.

Investigative device 12, or some other device, may store one or more investigative profiles 24 (104). For example, user 14 may pre-build one or more investigative profiles 24 and store them in storage device 44 or drive 27. As another example, user 14 may execute investigative tool 20 and build one or more investigative profiles 24 with configurator 38. As yet another example, user 14 may pre-build one or more investigative profiles 24 and store them in devices, other than investigative device 12. In examples where the one or more investigative profiles 24 are stored in a device other than investigative device 12, user 14 may import the one or more investigative profiles 24 into investigative device 12.

As described above, the one or more investigative profiles 24 identify a plurality of tools 22 and define the manner in which investigative tool 20 invokes the selected tools 22 for an investigation of one or more target computing devices 16. For example, each one of investigative profiles 24 specifies which tools 22 should be utilized, the order in which tools 22 should be invoked, specific operational parameters and manner in which each one of tools 22 should be invoked, and the manner in which error conditions should be handled.

Investigative tool 20 processes the investigative profiles 24 to provide a common executing framework for selective execution of the tools 22 identified by investigative profiles 24. Investigative tool 20 transfers one or more of the identified tools 22 and remote agent 54 to one or more target computing device 16 for storage, and in some examples, temporary storage (106). For example, as described above, investigative tool 20 may invoke the Samba tool, via communication link 46, to transfer one or more of the tools 22 and remote agent 54. Investigative tool 20 generates and stores the transferred tools 22 and remote agent 54 in a directory 58. As described above, in some examples, at the completion of the investigation, investigative tool 20 deletes directory 58 and all of the files stored in directory 58. However, in some alternate examples, tools 22, remote agent 54, and directory 58 may remain on one or more target computing device 16 permanently, or for a period of time after the completion of the investigation.

Investigative tool 20 temporarily executes remote agent 54 on one of target computing devices 16 (108). To execute remote agent 54, investigative tool 20 creates a temporary service, e.g., service $SVCNAME. The number of remote agents that investigative tool 20 executes is based on the number of target computing devices 16 that should be investigated. One or more investigative profiles 24 define the number of target computing devices 16 that should be investigated. The executed remote agent 54 is stored in directory 58.

To execute remote agent 54, investigative tool 20 invokes multiple Samba tools via communication link 48. The invocation of the Samba tools creates a service on target computing devices 16. The service includes remote agent 54, which when executed, executes tools 22 identified in one or more investigative profiles 24, and in the manner defined by one or more investigative profiles 24. For example, remote agent 54 executes tools 22 in the sequence specified in investigative profiles 24. Remote agent 54 also handles errors in the manner defined by investigative profiles 24.

Investigative tool 20 receives the data acquired by the execution of the selected tools 22 in the manner defined by investigative profiles 24 (110). Remote agent 54 transfers the acquired data via network connections 45. The manner in which remote agent 54 transfers the acquired data is defined by investigative profiles 24. For example, one or more investigative profiles 24 may define whether the acquired data should be compressed and/or encrypted, and whether the acquired data should be formatted in the raw format or XML format.

Figure 15:
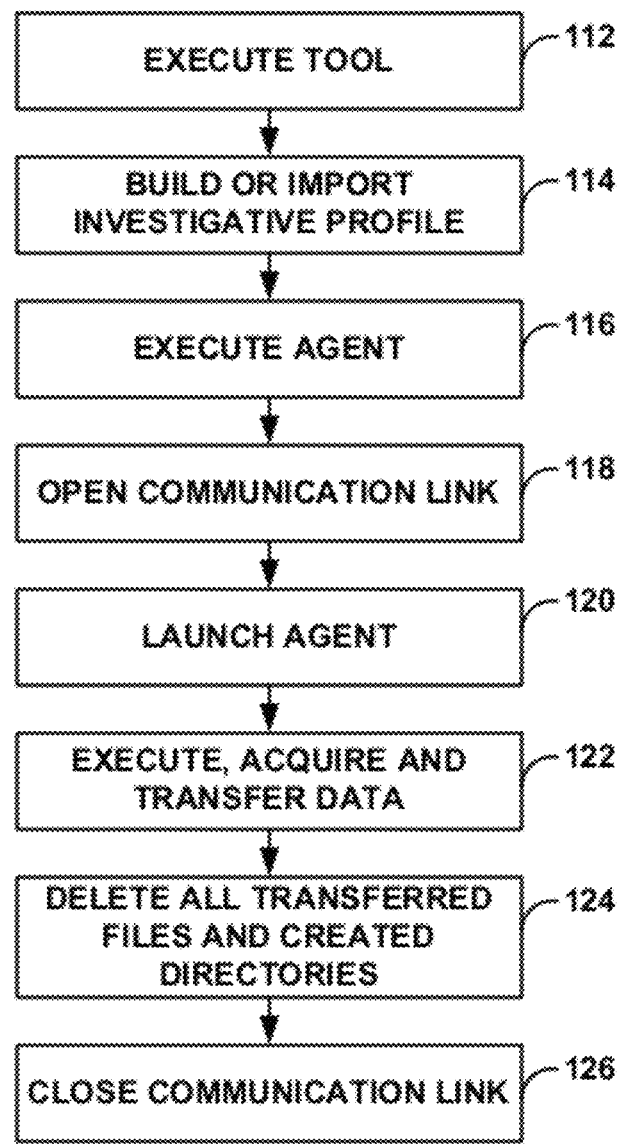
FIG. 15 is a flow diagram illustrating another example operation of a computer system in acquisition of computer data from one or more target computing devices.

FIG. 15 is a flow diagram illustrating another example operation of computer system 10 in acquisition of computer evidence from one or more target computing devices 16. For purposes of illustration, reference is made to FIG. 4.

User 14 executes investigative tool 20 (112). In one example, user 14 executes investigative tool 20 in a command line. In an alternate example, user 14 executes investigative tool 20 in a GUI.

User 14 either builds or imports one or more investigative profiles 24 (114). In some examples, user 14 builds one or more investigative profiles 24 in a text editor, and imports the built investigative profiles into investigative tool 20. In an alternate example, user 14 builds one or more investigative profiles 24 in a command line or a GUI presented by the execution of investigative tool 20.

Controller 40 executes one or more agents 42 based on one or more investigative profiles 24 to perform an investigation on the manner defined by investigative profiles 24 (116). Controller 40 establishes communication links 46 and 48 to transfer remote agent 54 and tools 22 set out in one or more investigative profiles 24 (118). Controller 40 then launches remote agent 54 on one of target computing devices 16 (120). Remote agent 54 then executes the identified tools 22, acquires the data based on one or more investigative profiles 24, and transfers the acquired data back to investigative device 12 via network connections 45 (122). In some examples, remote agent 54 then deletes all of the transferred files and any directory that was created on one or more target computing devices 16 (124). In some examples, remote agent 54 also deletes itself from one or more target computing devices 16. However, as described above, in some alternate examples, remote agent 54 may not delete all of the transferred files and any directory that was created on one or more target computing device 16. Also, in some alternate examples, remote agent 54 may not delete itself. Agent 42 then closes network connections 45 (126).

Figure 16:
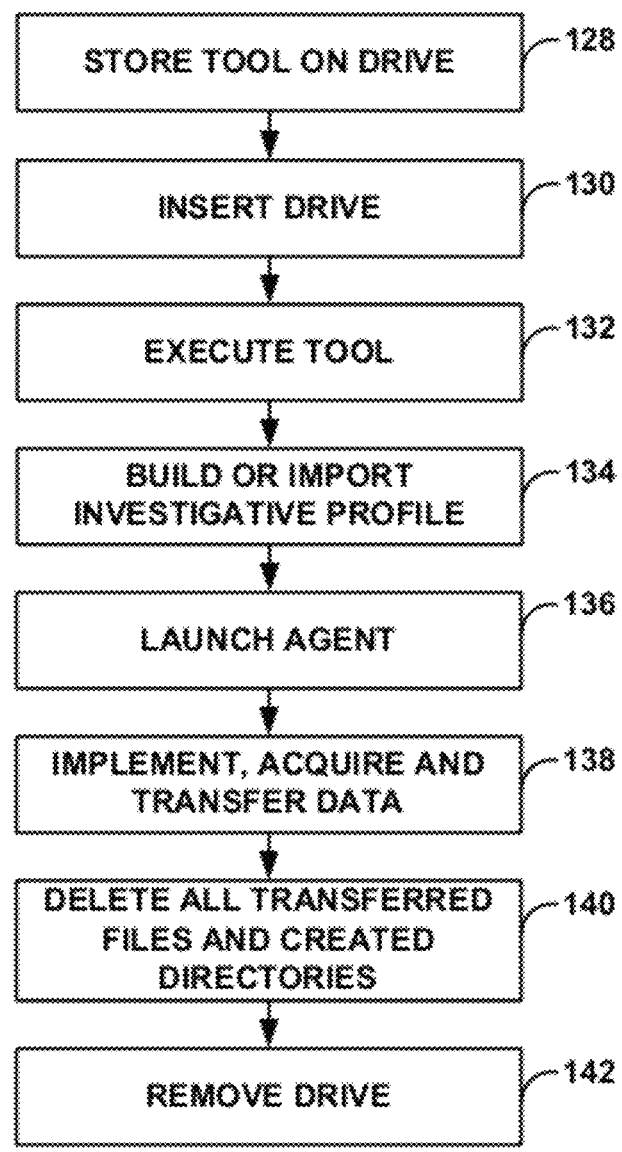
FIG. 16 is a flow diagram illustrating another example operation of a computer system in acquisition of computer data from a target computing device.

FIG. 16 is a flow diagram illustrating an example operation of computer system 26 in acquisition of computer evidence from target computing device 16A. For purposes of illustration, reference is made to FIGS. 2 and 4.

User 14 stores investigative tool 20 on drive 27 (128). User 14 also stores tool 22 identified in the one or more investigative profiles 24 in drive 27. User 14 inserts drive 27 into target computing device 16A, as one example (130). User 14 then executes investigative tool 20, from drive 27, on target computing device 16A (132).

In some examples, user 14 also builds one or more investigative profiles 24 and stores investigative profiles 24 on drive 27, or builds investigative profiles 24 on target computing device 16A after executing investigative tool 20 (134). User 14 launches, e.g., executes, investigative tool 20 on target computing device 16A (136). In this example, because drive 27 is directly connected to target computing device 16A, there may be no need to establish a communication link.

Investigative tool 20 then executes the identified tools 22, acquires the data based on one or more investigative profiles 24, and transfers the acquired data back to drive 27 (138). In some examples, although not required in every example, investigative tool 20 then deletes all of the transferred files and any directory that was created on target computing device 16A (140). User 14 then removes drives 24 from target computing device 16A (142).

The techniques described in this disclosure, including those attributed to investigative device 12, or various constituent components, may be implemented, at least in part, in hardware, software, firmware or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

Various examples have been described. These and other examples are within the scope of the following claims.

The invention claimed is:

1. A method comprising:

presenting, with an investigative device, a user interface configured to receive input, from a user, that specifies a plurality of different user-defined investigative profiles, each of the investigative profiles identifying a plurality of tools, defining a sequence in which the tools are to be invoked by an investigative device for an investigation of a target computing device, and defining a reporting structure of data collected from the investigation for the particular investigation, wherein at least two of the plurality of tools are configured to acquire different types of data from the target computing device as part of the investigation of the target computing device;

generating and storing, in response to the input, the plurality of investigative profiles, wherein one or more of the investigative profiles are non-executable data configuration information files arranged as text that specifies the plurality of tools, define the sequence in which the tools are to be invoked by the investigative device for the investigation of the target computing device, and define the reporting structure of data collected from the investigation for the particular investigation, and wherein at least two of the investigative profiles specify different sequences for invoking the tools;

receiving a selection of one of the investigative profiles;

configuring, responsive to the selection of one of the investigative profiles, an investigative tool on the investigative device for execution, on the target computing device, with the plurality of tools identified by the selected investigative profile to allow for collection of all desired data with one investigation of the target computing device and reporting of the collected data in the reporting structure defined by the selected investigative profile, wherein the investigative tool is configurable to operate in accordance with any of the plurality of investigative profiles;

establishing, with the investigative tool, a communication link with the target computing device, the communication link including at least an input socket between the investigative device on which the investigative tool is configured and the target computing device and a file transfer socket between the investigative device on which the investigative tool is configured and the target computing device for communicating with the target computing device;

automatically transferring, with the investigative device the tools identified by the selected profile and a remote agent, via the input socket, to the target computing device;

configuring, with the investigative tool, the remote agent on the target computing device to control execution, on the target computing device, of the tools identified by the selected investigative profile and in the sequence defined by the investigative profile;

receiving, with the investigative tool executing on the investigative device and from the remote agent via the file transfer socket, data acquired from the target computing device by the execution of the tools identified in the selected investigative profile and in the sequence defined by the selected investigative profile; and outputting, with the investigative tool executing on the investigative device, results of the data acquired from the target computing device, by the execution of the tools identified in the investigative profile, in the defined reporting structure.

2. The method of claim 1, wherein the selected investigative profile identifies the plurality of tools, defines the sequence in which the tools are invoked, and defines the reporting structure for an investigation of a plurality of target computing devices, and wherein the target computing device is one of the plurality of target computing devices.

3. The method of claim 2, wherein the selected investigative profile defines whether the investigation of the plurality of target computing devices occurs sequentially or in parallel.

4. The method of claim 1, wherein the selected investigative profile further defines at least one of a duration of the investigation of the target computing device, and a frequency of the investigation of the target computing device.

5. The method of claim 4, wherein the frequency of the investigation comprises real-time monitoring of the target computing device.

6. The method of claim 1, wherein configuring the remote agent comprises temporarily invoking a service that includes the remote agent on the target computing device.

7. The method of claim 1, wherein receiving data acquired from the target computing device comprises receiving at least one of encrypted and compressed data acquired from the target computing device.

8. The method of claim 1, wherein receiving data acquired from the target computing device comprises receiving the acquired data in raw format or extensible markup language (XML) format.

9. The method of claim 1, wherein the selected investigative profile further defines actions to be performed when the investigative tool encounters an error on the target computing device.

10. The method of claim 1, further comprising:

deleting, after receiving the data acquired from the target computing device, the transferred tools identified by the selected investigative profile, the remote agent, and a temporary directory within the target computing device where the transferred tools and the remote agent are temporarily stored.

11. The method of claim 1, wherein the investigation comprises at least one of a forensic examination, a monitoring and detection of an intrusion agent, and a monitoring of content on the target computing device.

12. An investigative device comprising:

a storage device; and a hardware unit configured to:

generate a plurality of different investigative profiles based on input, received from a user, via a presented user interface, that specifies the plurality of different investigative profiles, each of the investigative profiles identifying a plurality of tools, defining a sequence in which the tools are to be invoked by an investigative device for an investigation of a target computing device, and defining a reporting structure of data collected from the investigation for the particular investigation, wherein at least two of the plurality of tools are configured to acquire different types of data from the target computing device as part of the investigation of the target computing device, wherein one or more of the investigative profiles are non-executable data configuration information files arranged as text that specifies the plurality of tools, define the sequence in which the tools are to be invoked by the investigative device for the investigation of the target computing device, and define the reporting structure of data collected from the investigation for the particular investigation, and wherein at least two of the investigative profiles specify different sequences for invoking the tools;

store, in response to the input, the plurality of investigative profiles in the storage device;

receive a selection of one of the investigative profiles;

configure, responsive to the selection of one of the investigative profiles, an investigative tool on the investigative device for execution, on the target computing device, with the plurality of tools identified by the selected investigative profile to allow for collection of all desired data with one investigation of the target computing device and reporting of the collected data in the reporting structure defined by the selected investigative profile, wherein the investigative tool is configurable to operate in accordance with any of the plurality of investigative profiles;

establish, with the investigative tool, a communication link with the target computing device, the communication link including at least an input socket between the investigative device on which the investigative tool is configured and the target computing device and a file transfer socket between the investigative device on which the investigative tool is configured and the target computing device for communicating with the target computing device;

automatically transfer the tools identified by the selected profile and a remote agent, via the input socket, to the target computing device;

configure, with the investigative tool, the remote agent on the target computing device to control execution, on the target computing device, of the tools identified by the selected investigative profile and in the sequence defined by the investigative profile;

receive, with the investigative tool and from the remote agent via the file transfer docket, data acquired from the target computing device by the execution of the tools identified in the selected investigative profile and in the sequence defined by the selected investigative profile; and output results of the data acquired from the target computing device, by the execution of the tools identified in the investigative profile, in the defined reporting structure.

13. The investigative device of claim 12, wherein the selected investigative profile identifies the plurality of tools, defines the sequence in which the tools are invoked, and defines the reporting structure for an investigation of a plurality of target computing devices, and wherein the target computing device is one of the plurality of target computing devices.

14. The investigative device of claim 13, wherein the selected investigative profile defines whether the investigation of the plurality of target computing devices occurs sequentially or in parallel.

15. The investigative device of claim 12, wherein the selected investigative profile further defines at least one of a duration of the investigation of the target computing device, and a frequency of the investigation of the target computing device.

16. The investigative of claim 15, wherein the frequency of the investigation comprises real-time monitoring of the target computing device.

17. The investigative device of claim 12, wherein the investigative tool temporarily invokes a service that includes the remote agent on the target computing device to execute the remote agent.

18. The investigative device of claim 12, wherein the investigative tool receives at least one of encrypted and compressed data acquired from the target computing device.

19. The investigative device of claim 12, wherein the investigative tool receives the acquired data in raw format or extensible markup language (XML) format.

20. The investigative device of claim 12, wherein the selected investigative profile further defines actions to be performed when the investigative tool encounters an error on the target computing device.

21. The investigative device of claim 12, wherein, after the hardware unit receives the data acquired from the target computing device, the investigative tool deletes the transferred tools identified by the selected investigative profile, the remote agent, and a temporary directory within the target computing device where the transferred tools and the remote agent are temporarily stored.

22. The investigative device of claim 12, wherein the investigation comprises at least one of a forensic examination, a monitoring and detection of an intrusion agent, and a monitoring of content on the target computing device.

23. A non-transitory computer-readable storage medium comprising instructions that cause one or more processors of an investigative device to:

generate a plurality of different investigative profiles based on input, received from a user, via a presented user interface, that specifies the plurality of different investigative profiles, each of the investigative profiles identifying a plurality of tools, defining a sequence in which the tools are to be invoked by an investigative device for an investigation of a target computing device, and defining a reporting structure of data collected from the investigation for the particular investigation, wherein at least two of the plurality of tools are configured to acquire different types of data from the target computing device as part of the investigation of the target computing device, wherein one or more of the investigative profiles are non-executable data configuration information files arranged as text that specifies the plurality of tools, define the sequence in which the tools are to be invoked by the investigative device for the investigation of the target computing device, and define the reporting structure of data collected from the investigation for the particular investigation, and wherein at least two of the investigative profiles specify different sequences for invoking the tools;

store, in response to the input, the plurality of investigative profiles in a storage device;

receive a selection of one of the investigative profiles;

configure, responsive to the selection of one of the investigative profiles, an investigative tool on the investigative device for execution, on the target computing device, with the plurality of tools identified by the selected investigative profile to allow for collection of all desired data with one investigation of the target computing device and reporting of the collected data in the reporting structure defined by the selected investigative profile, wherein the investigative tool is configurable to operate in accordance with any of the plurality of investigative profiles;

establish, with the investigative tool, a communication link with the target computing device, the communication link including at least an input socket between the investigative device on which the investigative tool is configured and the target computing device and a file transfer socket between the investigative device on which the investigative tool is configured and the target computing device for communicating with the target computing device;

automatically transfer, with the investigative tool, the tools identified by the selected profile and a remote agent, via the input socket, to the target computing device;

configure, with the investigative tool, the remote agent on the target computing device to control execution, on the target computing device, of the tools identified by the selected investigative profile and in the sequence defined by the investigative profile;

receive, with the investigative tool and from the remote agent via the file transfer socket, data acquired from the target computing device by the execution of the tools identified in the selected investigative profile and in the sequence defined by the selected investigative profile; and output, with the investigative tool, results of the data acquired from the target computing device, by the execution of the tools identified in the investigative profile, in the defined reporting structure.

24. The method of claim 1, wherein each of the investigative profiles comprises a plurality of labels, wherein at least one of the labels includes a plurality of tags, wherein the plurality of tags includes a first tag that specifies which tools are to be executed, a second tag indicative of command-line arguments for executing the tools, and a third tag that indicates files needed by the tools specified in the first tag.

25. The method of claim 24, wherein presenting the user interface comprises presenting a graphical user interface (GUI) that includes input boxes to receive information of tools of the investigative profiles, and input boxes for information of the plurality of tags.

* * * * *